United States Patent
Sokhanvar et al.

(10) Patent No.: US 12,472,011 B2
(45) Date of Patent: Nov. 18, 2025

(54) DATA CAPTURE AND ADAPTIVE GUIDANCE FOR ROBOTIC PROCEDURES WITH AN ELONGATED MEDICAL DEVICE

(71) Applicant: Corindus, Inc., Waltham, MA (US)

(72) Inventors: Saeed Sokhanvar, Belmont, MA (US); Cameron Canale, Groton, MA (US); Omid Saber, Waltham, MA (US); Douglas Teany, Medfield, MA (US); Per Bergman, West Roxbury, MA (US); Steven J. Blacker, Framingham, MA (US)

(73) Assignee: Siemens Healthineers Endovascular Robotics, Inc., Newton, MA (US)

(*) Notice: Subject to any disclaimer, the term of this patent is extended or adjusted under 35 U.S.C. 154(b) by 591 days.

(21) Appl. No.: 17/597,038

(22) PCT Filed: Jul. 14, 2020

(86) PCT No.: PCT/US2020/041891
§ 371 (c)(1),
(2) Date: Dec. 23, 2021

(87) PCT Pub. No.: WO2021/011518
PCT Pub. Date: Jan. 21, 2021

(65) Prior Publication Data
US 2022/0296315 A1    Sep. 22, 2022

Related U.S. Application Data

(60) Provisional application No. 62/874,177, filed on Jul. 15, 2019.

(51) Int. Cl.
*A61B 34/10*        (2016.01)
*A61B 34/00*        (2016.01)
(Continued)

(52) U.S. Cl.
CPC .............. *A61B 34/25* (2016.02); *A61B 34/10* (2016.02); *A61B 34/20* (2016.02); *A61B 34/37* (2016.02);
(Continued)

(58) Field of Classification Search
CPC ......... A61B 34/25; A61B 34/10; A61B 34/20; A61B 34/37; A61B 2034/2046;
(Continued)

(56) References Cited

U.S. PATENT DOCUMENTS

| 3,821,525 A | 6/1974 | Eaton et al. |
| 5,312,338 A | 5/1994 | Nelson et al. |

(Continued)

FOREIGN PATENT DOCUMENTS

| EP | 2124800 | 11/2010 |
| WO | 2017083768 | 5/2017 |

(Continued)

OTHER PUBLICATIONS

"Objective Assessment of Endovascular Navigation Skills with Force Sensing" from "Annals of Biomedical Engineering, vol. 45, No. 5, May 2017 pp. 1315-1327" (Year: 2017).*

(Continued)

Primary Examiner — Yuhui R Pan

(57) ABSTRACT

An example data capture system generates profile using captured parameters from a reference operator. The data capture system includes a user interface to receive inputs from a reference operator for operation of one or more elongated medical devices (EMDs); a sensor system to capture parameters associated with the inputs from the reference operator; and a processing unit to generate at least one profile using the captured parameters, the profile being associated with a characteristic of the reference operator.

44 Claims, 9 Drawing Sheets

(51) Int. Cl.
*A61B 34/20* (2016.01)
*A61B 34/37* (2016.01)
*A61B 90/00* (2016.01)

(52) U.S. Cl.
CPC . *A61B 2034/2046* (2016.02); *A61B 2034/256* (2016.02); *A61B 2090/064* (2016.02)

(58) Field of Classification Search
CPC ........ A61B 2034/256; A61B 2090/064; A61B 2034/2074; A61B 2090/061; A61B 2090/374; A61B 2090/376; A61B 2090/378; A61B 90/37; A61B 2217/005; A61B 2034/301; A61B 2034/742; A61B 34/30; A61B 34/35; A61B 34/74

See application file for complete search history.

(56) References Cited

U.S. PATENT DOCUMENTS

| | | | |
|---|---|---|---|
| 5,350,101 | A | 9/1994 | Godlewski |
| 7,331,967 | B2 | 2/2008 | Lee et al. |
| 7,766,856 | B2 | 8/2010 | Ferry et al. |
| 7,766,894 | B2 | 8/2010 | Weitzner et al. |
| 7,972,298 | B2 | 7/2011 | Wallace et al. |
| 8,052,636 | B2 | 11/2011 | Moll et al. |
| 8,092,397 | B2 | 1/2012 | Wallace et al. |
| 8,343,096 | B2 | 1/2013 | Kirschenman et al. |
| 8,617,102 | B2 | 12/2013 | Moll et al. |
| 8,684,952 | B2 | 4/2014 | Weitzner et al. |
| 8,736,212 | B2 | 5/2014 | Sandhu et al. |
| 8,801,661 | B2 | 8/2014 | Moll et al. |
| 9,283,046 | B2 | 3/2016 | Walker et al. |
| 9,326,822 | B2 | 5/2016 | Lewis et al. |
| 9,408,669 | B2 | 8/2016 | Kokish et al. |
| 9,782,564 | B2 | 10/2017 | Zirps et al. |
| 9,814,864 | B2 | 11/2017 | Scarpine et al. |
| 9,825,455 | B2 | 11/2017 | Sandhu et al. |
| 10,213,264 | B2 | 2/2019 | Tanner et al. |
| 10,307,214 | B2 | 6/2019 | Lathrop et al. |
| 11,463,539 | B2 | 10/2022 | Rhee et al. |
| 2002/0168618 | A1 | 11/2002 | Anderson et al. |
| 2002/0177789 | A1 | 11/2002 | Ferry et al. |
| 2004/0254566 | A1 | 12/2004 | Plicchi et al. |
| 2007/0060879 | A1 | 3/2007 | Weitzner et al. |
| 2007/0293792 | A1 | 12/2007 | Sliwa et al. |
| 2008/0243064 | A1 | 10/2008 | Stahler et al. |
| 2009/0082722 | A1 | 3/2009 | Munger et al. |
| 2011/0144658 | A1* | 6/2011 | Wenderow ............. G16H 50/50 606/130 |
| 2011/0295887 | A1* | 12/2011 | Palmese ................. G16H 20/40 707/769 |
| 2012/0071752 | A1 | 3/2012 | Sewell et al. |
| 2013/0231678 | A1* | 9/2013 | Wenderow ............. A61B 34/37 606/130 |
| 2014/0081461 | A1* | 3/2014 | Williamson ........... B25J 9/1643 700/261 |
| 2014/0276389 | A1 | 9/2014 | Walker |
| 2015/0142013 | A1 | 5/2015 | Tanner et al. |
| 2016/0067448 | A1* | 3/2016 | Blacker .................. A61B 34/25 604/95.01 |
| 2016/0349044 | A1* | 12/2016 | Marell ................. G01B 21/045 |
| 2017/0007343 | A1 | 1/2017 | Yu |
| 2017/0056103 | A1* | 3/2017 | Fang .................. A61B 18/1492 |
| 2017/0231490 | A1 | 8/2017 | Toth et al. |
| 2017/0348060 | A1 | 12/2017 | Blacker |
| 2018/0177556 | A1* | 6/2018 | Noonan ................. A61B 34/10 |
| 2018/0250075 | A1 | 9/2018 | Cho |
| 2019/0090969 | A1* | 3/2019 | Jarc ......................... G16H 50/50 |
| 2019/0175887 | A1 | 6/2019 | Shameli |
| 2021/0307845 | A1* | 10/2021 | Park ......................... A61B 5/06 |

FOREIGN PATENT DOCUMENTS

| | | |
|---|---|---|
| WO | 2017139894 | 8/2017 |
| WO | 2018031861 | 2/2018 |
| WO | 2018039268 | 3/2018 |
| WO | 2019055701 | 3/2019 |

OTHER PUBLICATIONS

International Search Report for Corresponding PCT Application No. PCT/US2020/041891, dated Oct. 13, 2020.

Rafii-Tari, Hedyeh, et al. "Assessment of navigation cues with proximal force sensing during endovascular catheterization." International Conference on Medical Image Computing and Computer-Assisted Intervention. Springer, Berlin, Heidelberg, 2012.

Rafii-Tari, Hedyeh, et al. "Objective assessment of endovascular navigation skills with force sensing." Annals of biomedical engineering 45.5 (2017): 1315-1327.

European Search Report Received for Corresponding Application No. EP20839794.3, dated May 25, 2023.

\* cited by examiner

DATA CAPTURE AND ADAPTIVE GUIDANCE FOR ROBOTIC PROCEDURES WITH AN ELONGATED MEDICAL DEVICE

CROSS-REFERENCE TO RELATED APPLICATIONS

This application claims the benefit of U.S. Provisional Application 62/874,177, filed on Jul. 15, 2019, entitled: DATA CAPTURE AND ADAPTIVE GUIDANCE FOR ROBOTIC PROCEDURES WITH AN ELONGATED MEDICAL DEVICE.

FIELD

The present invention relates generally to the field of robotic medical procedure systems and, in particular, to systems, apparatus and methods related to capturing data associated with user inputs and providing adaptive guidance for procedures using elongated medical devices.

BACKGROUND

Catheters and other elongated medical devices (EMDs) may be used for minimally invasive medical procedures for the diagnosis and treatment of diseases of various vascular systems, including neurovascular intervention (NVI) also known as neurointerventional surgery, percutaneous coronary intervention (PCI) and peripheral vascular intervention (PVI). These procedures typically involve navigating a guidewire through the vasculature, and via the guidewire advancing a catheter to deliver therapy. The catheterization procedure starts by gaining access into the appropriate vessel, such as an artery or vein, with an introducer sheath using standard percutaneous techniques. Through the introducer sheath, a sheath or guide catheter is then advanced over a diagnostic guidewire to a primary location such as an internal carotid artery for NVI, a coronary ostium for PCI, or a superficial femoral artery for PVI. A guidewire suitable for the vasculature is then navigated through the sheath or guide catheter to a target location in the vasculature. In certain situations, such as in tortuous anatomy, a support catheter or microcatheter is inserted over the guidewire to assist in navigating the guidewire. The physician or operator may use an imaging system (e.g., fluoroscope) to obtain a cine with a contrast injection and select a fixed frame for use as a roadmap to navigate the guidewire or catheter to the target location, for example, a lesion. Contrast-enhanced images are also obtained while the physician delivers the guidewire or catheter so that the physician can verify that the device is moving along the correct path to the target location. While observing the anatomy using fluoroscopy, the physician manipulates the proximal end of the guidewire or catheter to direct the distal tip into the appropriate vessels toward the lesion or target anatomical location and avoid advancing into side branches.

Robotic catheter-based procedure systems have been developed that may be used to aid a physician in performing catheterization procedures such as, for example, NVI, PCI and PVI. Examples of NVI procedures include coil embolization of aneurysms, liquid embolization of arteriovenous malformations and mechanical thrombectomy of large vessel occlusions in the setting of acute ischemic stroke. In an NVI procedure, the physician uses a robotic system to gain target lesion access by controlling the manipulation of a neurovascular guidewire and microcatheter to deliver the therapy to restore normal blood flow. Target access is enabled by the sheath or guide catheter but may also require an intermediate catheter for more distal territory or to provide adequate support for the microcatheter and guidewire. The distal tip of a guidewire is navigated into, or past, the lesion depending on the type of lesion and treatment. For treating aneurysms, the microcatheter is advanced into the lesion and the guidewire is removed and several embolization coils are deployed into the aneurysm through the microcatheter and used to block blood flow into the aneurysm. For treating arteriovenous malformations, a liquid embolic is injected into the malformation via a microcatheter. Mechanical thrombectomy to treat vessel occlusions can be achieved either through aspiration and/or use of a stent retriever. Depending on the location of the clot, aspiration is either done through an aspiration catheter, or through a microcatheter for smaller arteries. Once the aspiration catheter is at the lesion, negative pressure is applied to remove the clot through the catheter. Alternatively, the clot can be removed by deploying a stent retriever through the microcatheter. Once the clot has integrated into the stent retriever, the clot is retrieved by retracting the stent retriever and microcatheter (or intermediate catheter) into the guide catheter.

In PCI, the physician uses a robotic system to gain lesion access by manipulating a coronary guidewire to deliver the therapy and restore normal blood flow. The access is enabled by seating a guide catheter in a coronary ostium. The distal tip of the guidewire is navigated past the lesion and, for complex anatomies, a microcatheter may be used to provide adequate support for the guidewire. The blood flow is restored by delivering and deploying a stent or balloon at the lesion. The lesion may need preparation prior to stenting, by either delivering a balloon for pre-dilation of the lesion, or by performing atherectomy using, for example, a laser or rotational atherectomy catheter and a balloon over the guidewire. Diagnostic imaging and physiological measurements may be performed to determine appropriate therapy by using imaging catheters or fractional flow reserve (FFR) measurements.

In PVI, the physician uses a robotic system to deliver the therapy and restore blood flow with techniques similar to NVI. The distal tip of the guidewire is navigated past the lesion and a microcatheter may be used to provide adequate support for the guidewire for complex anatomies. The blood flow is restored by delivering and deploying a stent or balloon to the lesion. As with PCI, lesion preparation and diagnostic imaging may be used as well.

When support at the distal end of a catheter or guidewire is needed, for example, to navigate tortuous or calcified vasculature, to reach distal anatomical locations, or to cross hard lesions, an over-the-wire (OTW) catheter or coaxial system is used. An OTW catheter has a lumen for the guidewire that extends the full length of the catheter. This provides a relatively stable system because the guidewire is supported along the whole length. This system, however, has some disadvantages, including higher friction, and longer overall length compared to rapid-exchange catheters (see below). Typically to remove or exchange an OTW catheter while maintaining the position of the indwelling guidewire, the exposed length (outside of the patient) of guidewire must be longer than the OTW catheter. A 300 cm long guidewire is typically sufficient for this purpose and is often referred to as an exchange length guidewire. Due to the length of the guidewire, two operators are needed to remove or exchange an OTW catheter. This becomes even more challenging if a triple coaxial, known in the art as a tri-axial system, is used (quadruple coaxial catheters have also been known to be used). However, due to its stability, an OTW system is often used in NVI and PVI procedures. On the other hand, PCI procedures often use rapid exchange (or monorail) catheters. The guidewire lumen in a rapid exchange catheter runs only through a distal section of the catheter, called the monorail or rapid exchange (RX) section. With a RX system, the operator manipulates the interventional devices parallel to each other (as opposed to with an OTW system, in which the devices are manipulated in a serial configuration), and the exposed length of guidewire only needs to be slightly longer than the RX section of the catheter. A rapid exchange length guidewire is typically 180-200 cm long. Given the shorter length guidewire and monorail, RX catheters can be exchanged by a single operator. However, RX catheters are often inadequate when more distal support is needed.

SUMMARY

In accordance with an embodiment, a data capture system generates profile using captured parameters from a reference operator. The data capture system includes a user interface to receive inputs from a reference operator for operation of one or more elongated medical devices (EMDs); a sensor system to capture parameters associated with the inputs from the reference operator; and a processing unit to generate at least one profile using the captured parameters, the profile being associated with a characteristic of the reference operator.

In one example, the parameters detected by the sensors include at least one of motion or load parameters.

In one example, the motion and load parameters include at least one of displacement, linear velocity, linear force, rotational velocity, rotational torque, acceleration, or frequency.

In one example, the parameters detected by the sensors include at least one of (a) a combination of linear velocity and linear force load; (b) a combination of rotational velocity and rotational torque; (c) combination of displacement and/or velocity and/or acceleration and linear force; or (d) combination of angular displacement and/or angular velocity and/or angular acceleration and torque.

In one example, the parameters detected by the sensors include a frequency of manipulation of the EMDs.

In one example, the parameters detected by the sensors include a combination of two or more of motion parameters, load parameters, position, displacement, frequency, linear velocity, linear force, rotational velocity or rotational torque.

In one example, the data capture system is a standalone or part of another system such as a robotic medical system or a training system.

In one example, the sensor system includes contact and/or noncontact sensors to detect motion and/or load of an EMD or stack of EMDs.

In one example, the sensor system includes signal conditioning.

In one example, the user interface includes more than one EMD and sensors system detects input parameters for concurrent operation of more than one EMD.

In one example, the input parameters are captured based on a heuristic model.

In one example, the characteristic of the reference operator includes at least one of physician metadata.

In one example, at least a part of the captured data may be associated with case metadata.

In one example, at least a portion of the captured data may be combination of physician metadata and case metadata.

In one example, the recording and retrieving of data can be local or non-local to the system.

In one example, the processing unit utilizes an algorithmic analysis of the inputs from one or more operators in forming profiles.

In one example, the processing unit is to generate a power profile associated with the operator's profile containing the motion and load parameters.

In one example, the processing unit calculates and determines the envelope of ranges of motion, load and power parameters.

In one example, the processing unit is to generate adaptive guidance parameters for the EMD manipulation based on the motion and load parameters contained in the operator's profile.

In one example, the processing unit is to generate motion and/or load profiles associated to one or more EMD.

In one example, the motion profile is built based on only motion parameters of the operator's profile for one EMD including concurrent rotational and linear motion of the EMD.

In one example, the motion pattern is built based on motion parameters of the operator's profile for more than one EMD including concurrent rotational and/or linear motion of a first EMD and rotational and/or linear motion of a second EMD.

In one example, the motion profile is built based on load parameters of the operator's profile for more than one EMD.

In one example, the motion profile is built based on both motion and load parameters of the operator's profile for more than one EMD.

In one example, the processing unit is to generate a master profile by combining physician metadata and case metadata.

In one example, the processing unit is to combine the captured data from the reference operator with additional captured data from additional operators to generate aggregated profiles.

In one example, the generated profiles are updated with further captured data from further additional operators.

In one example, the processing unit updates the profile(s) as new input data are available, for example, after successive procedures on an ongoing basis.

In one example, the processing unit converts the inputs from the operator, combined with the other metadata, to the operational governing equations, operational limits, and commands.

In one example, the processing unit can generate, or update the profiles, and convert the data to operational rules either off-line or in real time.

In one example, the processing unit is to provide feedback to a second operator based on the generated profiles.

In one example, the feedback is provided during a training simulation.

In one example, the feedback is provided during a live procedure performed by the second operator.

In one example, the second operator can selectively accept or reject the feedback.

In one example, the processing unit generates adaptive guidance parameters.

In one example, the adaptive guidance parameters include at least one of operational governing equations or limits, procedural recommendations, motion profiles, or general rule-based motion and load, applied to the EMDs, or procedure.

In another embodiment, a robotic medical system includes modules to actuate one or more EMDs independently and in concert; a user interface to receive inputs from a reference operator to manipulate the EMD(s); a sensor system to detect motion and/or load parameters applied to the EMD(s); a data capture portion to capture the parameters detected by the sensors associated with the inputs from the reference operator, the captured parameters including at least one motion or load parameter, wherein the data capture portion is to associate the captured parameters with a characteristic of the reference operator; and a processing unit to convert the detected parameters to operational governing equations for the elongated medical devices and procedure.

In another embodiment, a method includes capturing input parameters from a reference operator of a robotic device, the captured input parameters including at least one motion or load parameter; converting the captured input parameters to operational commands for the robotic device; and generating a profile using the captured input parameters, the profile being associated with a characteristic of the reference operator.

In another embodiment, a non-transitory computer-readable storage medium is encoded with instructions executable by a processor of a computing system. The computer-readable storage medium includes instructions to capture input parameters from a reference operator of a robotic device, the captured input parameters including at least one motion or load parameter; convert the captured input parameters to operational commands, for the robotic device; and generate a profile using the captured input parameters, the profile being associated with a characteristic of the reference operator.

In another embodiment, a computer-implemented method includes capturing input parameters from a reference operator of a robotic device, the captured input parameters including at least one motion or load parameter; converting the captured input parameters to operational commands for the robotic device; and generating a profile using the captured input parameters, the profile being associated with a characteristic of the reference operator.

In another embodiment, a data capture system includes a user interface to receive inputs from a reference operator for operation of an elongated medical device, the user interface including sensors to detect parameters associated with the inputs from the reference operator; a recording portion to capture the parameters detected by the sensors associated with the inputs from the reference operator, the captured parameters including at least one motion or load parameter; and a processing unit to generate parameters for adaptive guidance for operation of the elongated medical device based on the captured input parameters.

In another embodiment, a robotic medical system includes a user interface to receive inputs from a reference operator; a sensor system to detect parameters associated with the inputs from the reference operator; a data capture portion to capture the parameters detected by the sensors associated with the inputs from the reference operator; a processing unit to convert the inputs from the operator to operational adaptive guidance for the elongated medical devices and procedure; and at least one module to actuate one or more EMDs independently and in coordination.

In another embodiment, a method includes capturing input parameters from a reference operator of an elongated medical device, the captured input parameters including at least one motion or load parameter; converting the captured input parameters to operational commands for the elongated medical device; and generating guidance parameters for the elongated medical device based on the captured input parameters.

In another embodiment, a non-transitory computer-readable storage medium is encoded with instructions executable by a processor of a computing system. The computer-readable storage medium includes instructions to capture input parameters from a reference operator of a robotic device, the captured input parameters including at least one motion or load parameter; convert the captured input parameters to operational commands for the robotic device; and generate guidance parameters for the elongated medical device based on the captured input parameters.

In another embodiment, a computer-implemented method includes capturing input parameters from a reference operator of a robotic device, the captured input parameters including at least one motion or load parameter; converting the captured input parameters to operational commands for the robotic device; and generating guidance parameters for the elongated medical device based on the captured input parameters.

In another embodiment, a data capture system generating profile using captured parameters from a reference operator includes a user interface to receive inputs from a reference operator for operation of one or more elongated medical devices (EMDs) and a sensor system to capture parameters associated with the inputs from the reference operator, wherein the parameters detected by the sensors include at least one of (a) a combination of linear velocity and linear force load; (b) a combination of rotational velocity and rotational torque; (c) combination of displacement and/or velocity and/or acceleration and linear force; or (d) combination of angular displacement and/or angular velocity and/or angular acceleration and torque.

In another embodiment, a data capture system generating profile using captured parameters from a reference operator includes a user interface to receive inputs from a reference operator for operation of one or more elongated medical devices (EMDs) and a sensor system to capture parameters associated with the inputs from the reference operator, wherein the parameters detected by the sensors include a combination of two or more of motion parameters, load parameters, position, displacement, frequency, linear velocity, linear force, rotational velocity or rotational torque.

BRIEF DESCRIPTION OF THE DRAWINGS

The invention will become more fully understood from the following detailed description, taken in conjunction with the accompanying drawings, wherein the reference numerals refer to like parts in which.

DETAILED DESCRIPTION

Figure 1:
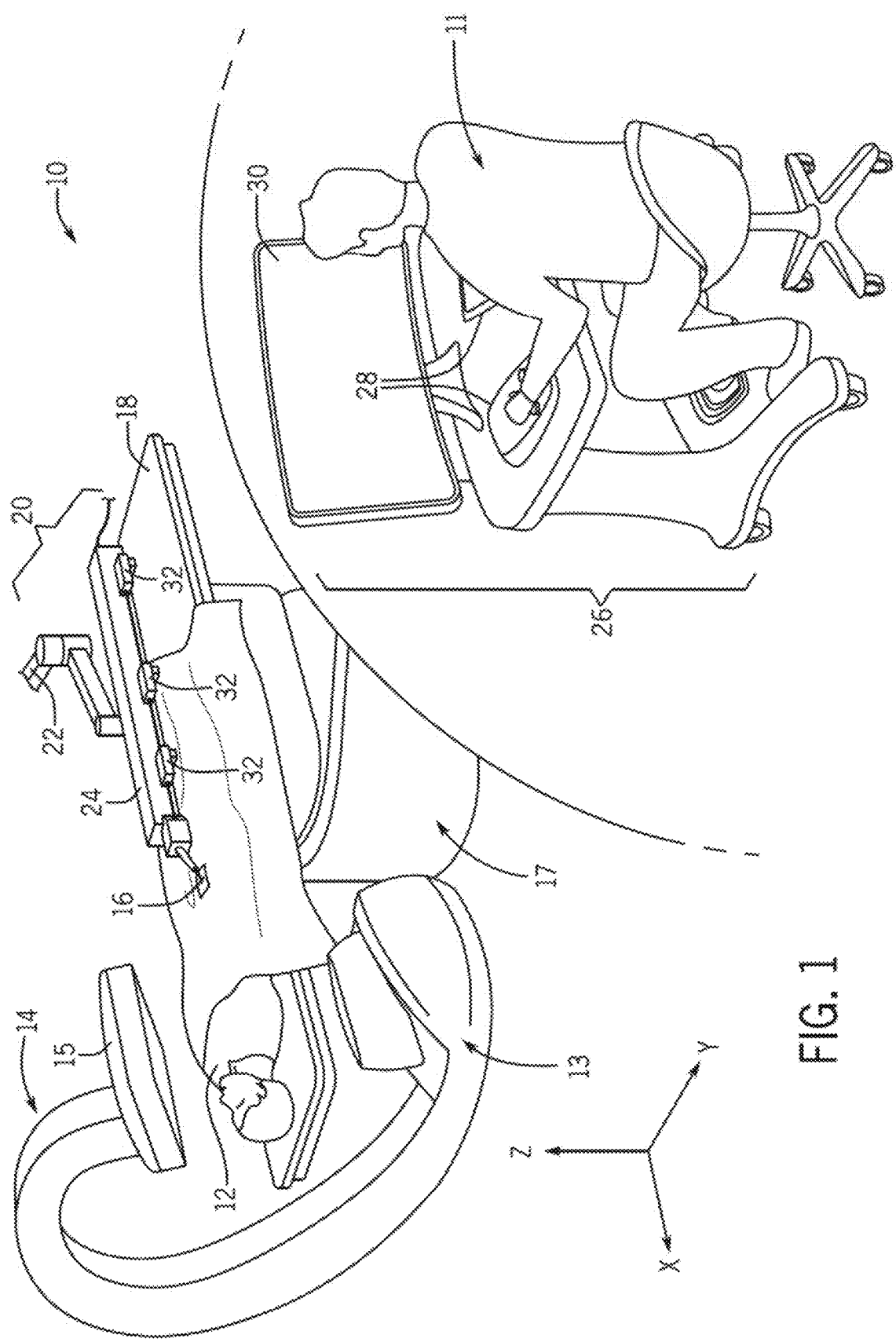
FIG. 1 is a perspective view of an exemplary catheter-based procedure system in accordance with an embodiment.

FIG. 1 is a perspective view of an exemplary catheter-based procedure system 10 in accordance with an embodiment. Catheter-based procedure system 10 may be used to perform catheter-based medical procedures, e.g., percutaneous intervention procedures such as a percutaneous coronary intervention (PCI) (e.g., to treat STEMI), a neurovascular interventional procedure (NVI) (e.g., to treat an emergent large vessel occlusion (ELVO)), peripheral vascular intervention procedures (PVI) (e.g., for critical limb ischemia (CLI), etc.). Catheter-based medical procedures may include diagnostic catheterization procedures during which one or more catheters or other elongated medical devices (EMDs) are used to aid in the diagnosis of a patient's disease. For example, during one embodiment of a catheter-based diagnostic procedure, a contrast media is injected onto one or more arteries through a catheter and an image of the patient's vasculature is taken. Catheter-based medical procedures may also include catheter-based therapeutic procedures (e.g., angioplasty, stent placement, treatment of peripheral vascular disease, clot removal, arterial venous malformation therapy, treatment of aneurysm, etc.) during which a catheter (or other EMD) is used to treat a disease. Therapeutic procedures may be enhanced by the inclusion of adjunct devices 54 (shown in FIG. 2) such as, for example, intravascular ultrasound (IVUS), optical coherence tomography (OCT), fractional flow reserve (FFR), etc. It should be noted, however, that one skilled in the art would recognize that certain specific percutaneous intervention devices or components (e.g., type of guidewire, type of catheter, etc.) may be selected based on the type of procedure that is to be performed. Catheter-based procedure system 10 can perform any number of catheter-based medical procedures with minor adjustments to accommodate the specific percutaneous intervention devices to be used in the procedure.

Catheter-based procedure system 10 includes, among other elements, a bedside unit 20 and a control station 26. Bedside unit 20 includes a robotic drive 24 and a positioning system 22 that are located adjacent to a patient 12. Patient 12 is supported on a patient table 18. The positioning system 22 is used to position and support the robotic drive 24. The positioning system 22 may be, for example, a robotic arm, an articulated arm, a holder, etc. The positioning system 22 may be attached at one end to, for example, a rail on the patient table 18, a base, or a cart. The other end of the positioning system 22 is attached to the robotic drive 24. The positioning system 22 may be moved out of the way (along with the robotic drive 24) to allow for the patient 12 to be placed on the patient table 18. Once the patient 12 is positioned on the patient table 18, the positioning system 22 may be used to situate or position the robotic drive 24 relative to the patient 12 for the procedure. In an embodiment, patient table 18 is operably supported by a pedestal 17, which is secured to the floor and/or earth. Patient table 18 is able to move with multiple degrees of freedom, for example, roll, pitch, and yaw, relative to the pedestal 17. Bedside unit 20 may also include controls and displays 46 (shown in FIG. 2). For example, controls and displays may be located on a housing of the robotic drive 24.

Generally, the robotic drive 24 may be equipped with the appropriate percutaneous interventional devices and accessories 48 (shown in FIG. 2) (e.g., guidewires, various types of catheters including balloon catheters, stent delivery systems, stent retrievers, embolization coils, liquid embolics, aspiration pumps, device to deliver contrast media, medicine, hemostasis valve adapters, syringes, stopcocks, inflation device, etc.) to allow the user or operator 11 to perform a catheter-based medical procedure via a robotic system by operating various controls such as the controls and inputs located at the control station 26. Bedside unit 20, and in particular robotic drive 24, may include any number and/or combination of components to provide bedside unit 20 with the functionality described herein. A user or operator 11 at control station 26 is referred to as the control station user or control station operator and referred to herein as user or operator. A user or operator at bedside unit 20 is referred to as bedside unit user or bedside unit operator. The robotic drive 24 includes a plurality of device modules 32a-d mounted to a rail or linear member 60 (shown in FIG. 3). The rail or linear member 60 guides and supports the device modules. Each of the device modules 32a-d may be used to drive an EMD such as a catheter or guidewire. For example, the robotic drive 24 may be used to automatically feed a guidewire into a diagnostic catheter and into a guide catheter in an artery of the patient 12. One or more devices, such as an EMD, enter the body (e.g., a vessel) of the patient 12 at an insertion point 16 via, for example, an introducer sheath.

Bedside unit 20 is in communication with control station 26, allowing signals generated by the user inputs of control station 26 to be transmitted wirelessly or via hardwire to bedside unit 20 to control various functions of bedside unit 20. As discussed below, control station 26 may include a control computing system 34 (shown in FIG. 2) or be coupled to the bedside unit 20 through a control computing system 34. Bedside unit 20 may also provide feedback signals (e.g., loads, speeds, operating conditions, warning signals, error codes, etc.) to control station 26, control computing system 34 (shown in FIG. 2), or both. Communication between the control computing system 34 and various components of the catheter-based procedure system 10 may be provided via a communication link that may be a wireless connection, cable connections, or any other means capable of allowing communication to occur between components. Control station 26 or other similar control system may be located either at a local site (e.g., local control station 38 shown in FIG. 2) or at a remote site (e.g., remote control station and computer system 42 shown in FIG. 2). Catheter procedure system 10 may be operated by a control station at the local site, a control station at a remote site, or both the local control station and the remote control station at the same time. At a local site, user or operator 11 and control station 26 are located in the same room or an adjacent room to the patient 12 and bedside unit 20. As used herein, a local site is the location of the bedside unit 20 and a patient 12 or subject (e.g., animal or cadaver) and the remote site is the location of a user or operator 11 and a control station 26 used to control the bedside unit 20 remotely. A control station 26

(and a control computing system) at a remote site and the bedside unit 20 and/or a control computing system at a local site may be in communication using communication systems and services 36 (shown in FIG. 2), for example, through the Internet. In an embodiment, the remote site and the local (patient) site are away from one another, for example, in different rooms in the same building, different buildings in the same city, different cities, or other different locations where the remote site does not have physical access to the bedside unit 20 and/or patient 12 at the local site.

Control station 26 generally includes one or more input modules 28 configured to receive user inputs to operate various components or systems of catheter-based procedure system 10. In the embodiment shown, control station 26 allows the user or operator 11 to control bedside unit 20 to perform a catheter-based medical procedure. For example, input modules 28 may be configured to cause bedside unit 20 to perform various tasks using percutaneous intervention devices (e.g., EMDs) interfaced with the robotic drive 24 (e.g., to advance, retract, or rotate a guidewire, advance, retract or rotate a catheter, inflate or deflate a balloon located on a catheter, position and/or deploy a stent, position and/or deploy a stent retriever, position and/or deploy a coil, inject contrast media into a catheter, inject liquid embolics into a catheter, inject medicine or saline into a catheter, aspirate on a catheter, or to perform any other function that may be performed as part of a catheter-based medical procedure). Robotic drive 24 includes various drive mechanisms to cause movement (e.g., axial and rotational movement) of the components of the bedside unit 20 including the percutaneous intervention devices.

In one embodiment, input modules 28 may include one or more touch screens, joysticks, scroll wheels, and/or buttons. In addition to input modules 28, the control station 26 may use additional user controls 44 (shown in FIG. 2) such as foot switches and microphones for voice commands, etc. Input modules 28 may be configured to advance, retract, or rotate various components and percutaneous intervention devices such as, for example, a guidewire, and one or more catheters or microcatheters. Buttons may include, for example, an emergency stop button, a multiplier button, device selection buttons and automated move buttons. When an emergency stop button is pushed, the power (e.g., electrical power) is shut off or removed to bedside unit 20. When in a speed control mode, a multiplier button acts to increase or decrease the speed at which the associated component is moved in response to a manipulation of input modules 28. When in a position control mode, a multiplier button changes the mapping between input distance and the output commanded distance. Device selection buttons allow the user or operator 11 to select which of the percutaneous intervention devices loaded into the robotic drive 24 are controlled by input modules 28. Automated move buttons are used to enable algorithmic movements that the catheter-based procedure system 10 may perform on a percutaneous intervention device without direct command from the user or operator 11. In one embodiment, input modules 28 may include one or more controls or icons (not shown) displayed on a touch screen (that may or may not be part of a display 30), that, when activated, causes operation of a component of the catheter-based procedure system 10. Input modules 28 may also include a balloon or stent control that is configured to inflate or deflate a balloon and/or deploy a stent. Each of the input modules 28 may include one or more buttons, scroll wheels, joysticks, touch screen, etc. that may be used to control the particular component or components to which the control is dedicated. In addition, one or more touch screens may display one or more icons (not shown) related to various portions of input modules 28 or to various components of catheter-based procedure system 10.

Control station 26 may include a display 30. In other embodiments, the control station 26 may include two or more displays 30. Display 30 may be configured to display information or patient specific data to the user or operator 11 located at control station 26. For example, display 30 may be configured to display image data (e.g., X-ray images, MRI images, CT images, ultrasound images, etc.), hemodynamic data (e.g., blood pressure, heart rate, etc.), patient record information (e.g., medical history, age, weight, etc.), lesion or treatment assessment data (e.g., IVUS, OCT, FFR, etc.). In addition, display 30 may be configured to display procedure specific information (e.g., procedural checklist, recommendations, duration of procedure, catheter or guidewire position, volume of medicine or contrast agent delivered, etc.). Further, display 30 may be configured to display information to provide the functionalities associated with control computing system 34 (shown in FIG. 2). Display 30 may include touch screen capabilities to provide some of the user input capabilities of the system.

Catheter-based procedure system 10 also includes an imaging system 14. Imaging system 14 may be any medical imaging system that may be used in conjunction with a catheter based medical procedure (e.g., non-digital X-ray, digital X-ray, CT, MRI, ultrasound, etc.). In an exemplary embodiment, imaging system 14 is a digital X-ray imaging device that is in communication with control station 26. In one embodiment, imaging system 14 may include a C-arm (shown in FIG. 1) that allows imaging system 14 to partially or completely rotate around patient 12 in order to obtain images at different angular positions relative to patient 12 (e.g., sagittal views, caudal views, anterior-posterior views, etc.). In one embodiment imaging system 14 is a fluoroscopy system including a C-arm having an X-ray source 13 and a detector 15, also known as an image intensifier.

Imaging system 14 may be configured to take X-ray images of the appropriate area of patient 12 during a procedure. For example, imaging system 14 may be configured to take one or more X-ray images of the head to diagnose a neurovascular condition. Imaging system 14 may also be configured to take one or more X-ray images (e.g., real time images) during a catheter-based medical procedure to assist the user or operator 11 of control station 26 to properly position a guidewire, guide catheter, microcatheter, stent retriever, coil, stent, balloon, etc. during the procedure. The image or images may be displayed on display 30. For example, images may be displayed on display 30 to allow the user or operator 11 to accurately move a guide catheter or guidewire into the proper position.

In order to clarify directions, a rectangular coordinate system is introduced with X, Y, and Z axes. The positive X axis is oriented in a longitudinal (axial) distal direction, that is, in the direction from the proximal end to the distal end, stated another way from the proximal to distal direction. The Y and Z axes are in a transverse plane to the X axis, with the positive Z axis oriented up, that is, in the direction opposite of gravity, and the Y axis is automatically determined by right-hand rule.

Figure 2:
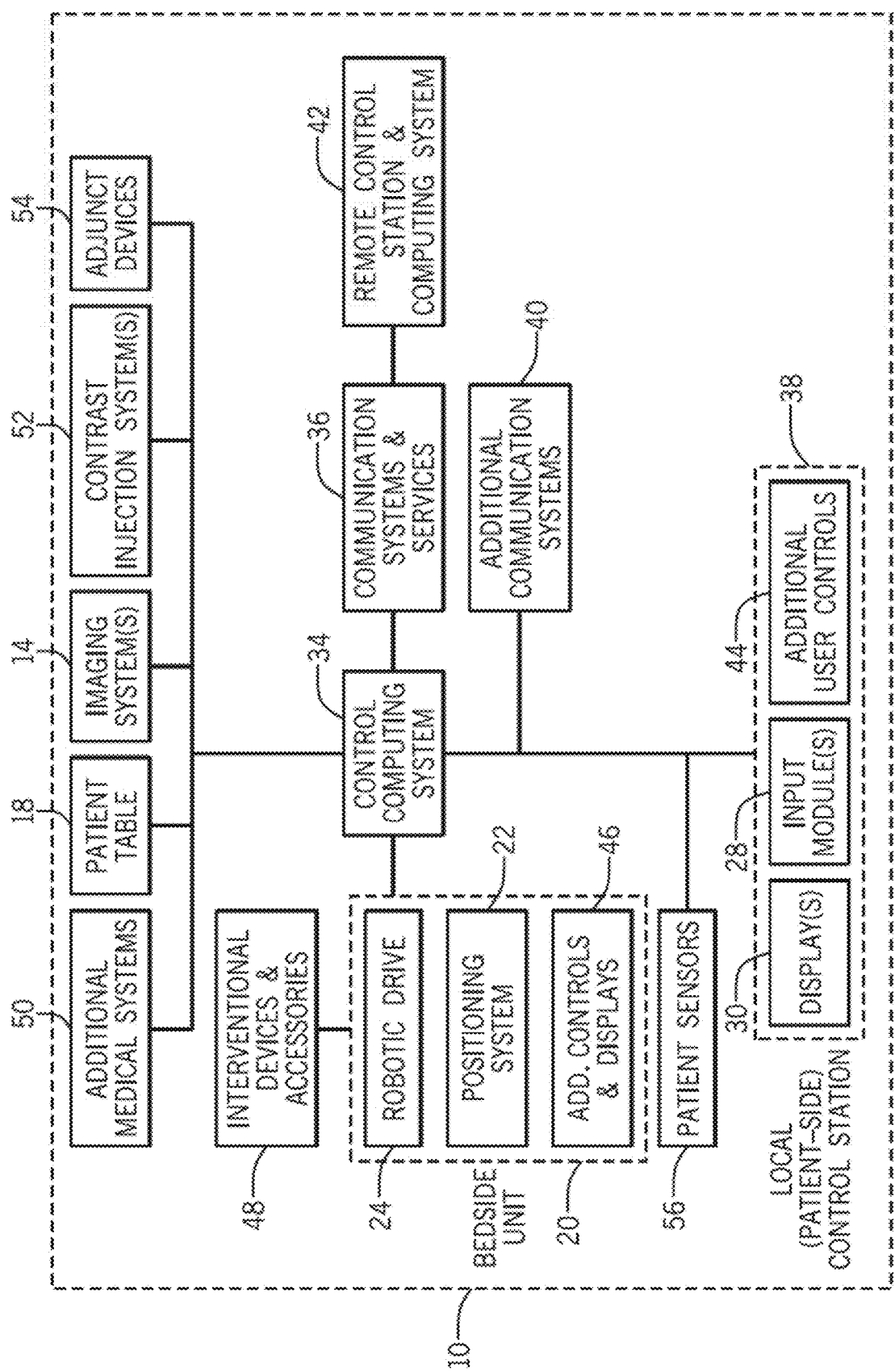
FIG. 2 is a schematic block diagram of an exemplary catheter-based procedure system in accordance with an embodiment.

FIG. 2 is a block diagram of catheter-based procedure system 10 in accordance with an exemplary embodiment. Catheter-procedure system 10 may include a control computing system 34. Control computing system 34 may physically be, for example, part of control station 26 (shown in FIG. 1). Control computing system 34 may generally be an electronic control unit suitable to provide catheter-based procedure system 10 with the various functionalities described herein. For example, control computing system 34 may be an embedded system, a dedicated circuit, a general-purpose system programmed with the functionality described herein, etc. Control computing system 34 is in communication with bedside unit 20, communications systems and services 36 (e.g., Internet, firewalls, cloud services, session managers, a hospital network, etc.), a local control station 38, additional communications systems 40 (e.g., a telepresence system), a remote control station and computing system 42, and patient sensors 56 (e.g., electrocardiogram (ECG) devices, electroencephalogram (EEG) devices, blood pressure monitors, temperature monitors, heart rate monitors, respiratory monitors, etc.). The control computing system is also in communication with imaging system 14, patient table 18, additional medical systems 50, contrast injection systems 52 and adjunct devices 54 (e.g., IVUS, OCT, FFR, etc.). The bedside unit 20 includes a robotic drive 24, a positioning system 22 and may include additional controls and displays 46. As mentioned above, the additional controls and displays may be located on a housing of the robotic drive 24. Interventional devices and accessories 48 (e.g., guidewires, catheters, etc.) interface to the bedside system 20. In an embodiment, interventional devices and accessories 48 may include specialized devices (e.g., IVUS catheter, OCT catheter, FFR wire, diagnostic catheter for contrast, etc.) which interface to their respective adjunct devices 54, namely, an IVUS system, an OCT system, and FFR system, etc.

In various embodiments, control computing system 34 is configured to generate control signals based on the user's interaction with input modules 28 (e.g., of a control station 26 (shown in FIG. 1) such as a local control station 38 or a remote control station 42) and/or based on information accessible to control computing system 34 such that a medical procedure may be performed using catheter-based procedure system 10. The local control station 38 includes one or more displays 30, one or more input modules 28, and additional user controls 44. The remote control station and computing system 42 may include similar components to the local control station 38. The remote 42 and local 38 control stations can be different and tailored based on their required functionalities. The additional user controls 44 may include, for example, one or more foot input controls. The foot input control may be configured to allow the user to select functions of the imaging system 14 such as turning on and off the X-ray and scrolling through different stored images. In another embodiment, a foot input device may be configured to allow the user to select which devices are mapped to scroll wheels included in input modules 28. Additional communication systems 40 (e.g., audio conference, video conference, telepresence, etc.) may be employed to help the operator interact with the patient, medical staff (e.g., angio-suite staff), and/or equipment in the vicinity of the bedside.

Catheter-based procedure system 10 may be connected or configured to include any other systems and/or devices not explicitly shown. For example, catheter-based procedure system 10 may include image processing engines, data storage and archive systems, automatic balloon and/or stent inflation systems, medicine injection systems, medicine tracking and/or logging systems, user logs, encryption systems, systems to restrict access or use of catheter-based procedure system 10, etc.

Figure 3:
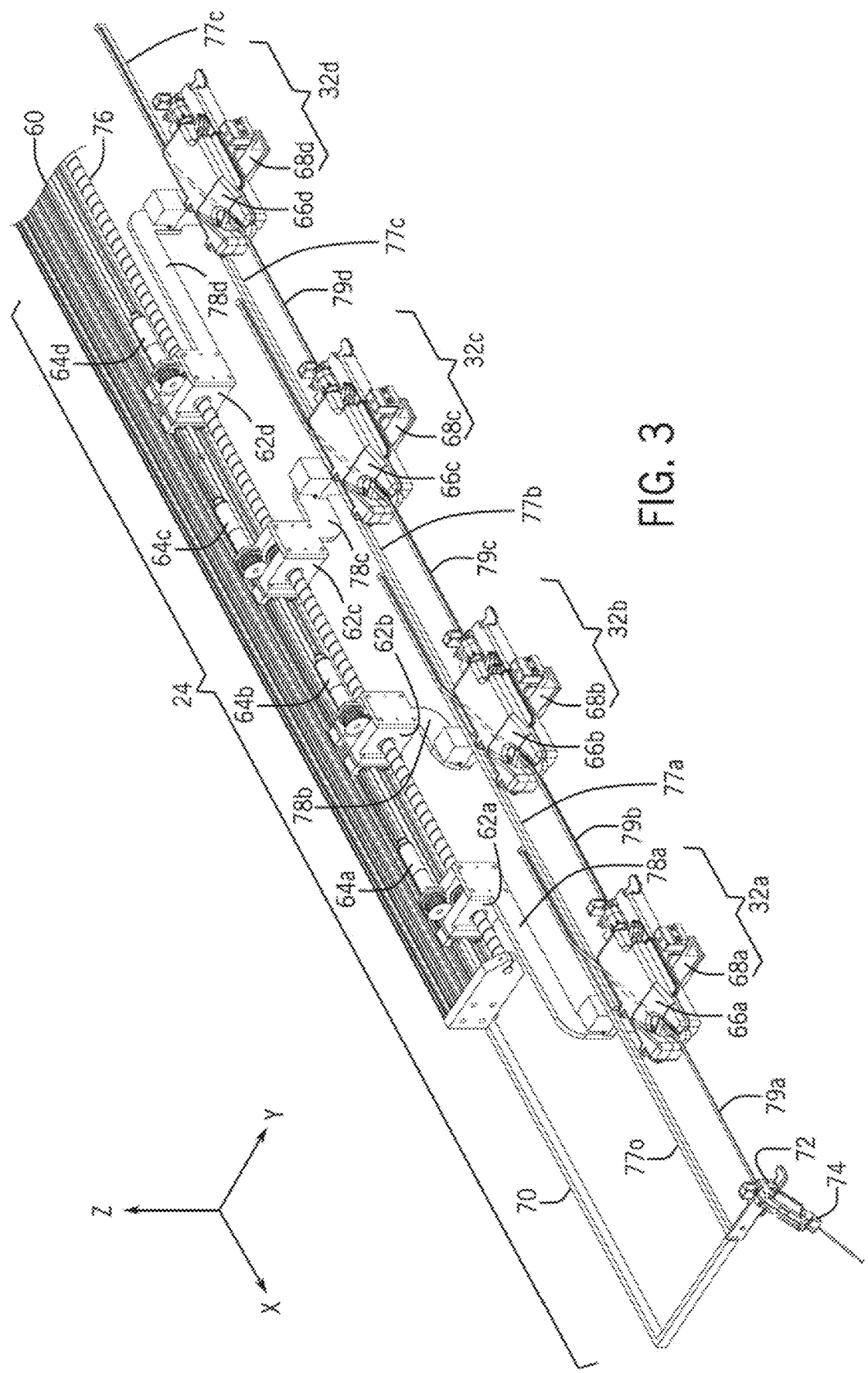
FIG. 3 is a perspective view of a robotic drive for a catheter-based procedure system in accordance with an embodiment.

As mentioned, control computing system 34 is in communication with bedside unit 20 which includes a robotic drive 24, a positioning system 22 and may include additional controls and displays 46, and may provide control signals to the bedside unit 20 to control the operation of the motors and drive mechanisms used to drive the percutaneous intervention devices (e.g., guidewire, catheter, etc.). The various drive mechanisms may be provided as part of a robotic drive 24. FIG. 3 is a perspective view of a robotic drive for a catheter-based procedure system 10 in accordance with an embodiment. In FIG. 3, a robotic drive 24 includes multiple device modules 32a-d coupled to a linear member 60. Each device module 32a-d is coupled to the linear member 60 via a stage 62a-d moveably mounted to the linear member 60. A device module 32a-d may be connected to a stage 62a-d using a connector such as an offset bracket 78a-d. In another embodiment, the device module 32a-d is directly mounted to the stage 62a-d. Each stage 62a-d may be independently actuated to move linearly along the linear member 60. Accordingly, each stage 62a-d (and the corresponding device module 32a-d coupled to the stage 62a-d) may independently move relative to each other and the linear member 60. A drive mechanism is used to actuate each stage 62a-d. In the embodiment shown in FIG. 3, the drive mechanism includes independent stage translation motors 64a-d coupled to each stage 62a-d and a stage drive mechanism 76, for example, a lead screw via a rotating nut, a rack via a pinion, a belt via a pinion or pulley, a chain via a sprocket, or the stage translation motors 64a-d may be linear motors themselves. In some embodiments, the stage drive mechanism 76 may be a combination of these mechanisms, for example, each stage 62a-d could employ a different type of stage drive mechanism. In an embodiment where the stage drive mechanism is a lead screw and rotating nut, the lead screw may be rotated and each stage 62a-d may engage and disengage from the lead screw to move, e.g., to advance or retract. In the embodiment shown in FIG. 3, the stages 62a-d and device modules 32a-d are in a serial drive configuration.

Each device module 32a-d includes a drive module 68a-d and a cassette 66a-d mounted on and coupled to the drive module 68a-d. In the embodiment shown in FIG. 3, each cassette 66a-d is mounted to the drive module 68a-d in a vertical orientation. In other embodiments, each cassette 66a-d may be mounted to the drive module 68a-d in other mounting orientations. Each cassette 66a-d is configured to interface with and support a proximal portion of an EMD (not shown). In addition, each cassette 66a-d may include elements to provide one or more degrees of freedom in addition to the linear motion provided by the actuation of the corresponding stage 62a-d to move linearly along the linear member 60. For example, the cassette 66a-d may include elements that may be used to rotate the EMD when the cassette is coupled to the drive module 68a-d. Each drive module 68a-d includes at least one coupler to provide a drive interface to the mechanisms in each cassette 66a-d to provide the additional degree of freedom. Each cassette 66a-d also includes a channel in which a device support 79a-d is positioned, and each device support 79a-d is used to prevent an EMD from buckling. A support arm 77a, 77b, and 77c is attached to each device module 32a, 32b, and 32c, respectively, to provide a fixed point for support of a proximal end of the device supports 79b, 79c, and 79d, respectively. The robotic drive 24 may also include a device support connection 72 connected to a device support 79, a distal support arm 70 and a support arm $77_0$. Support arm $77_0$ is used to provide a fixed point for support of the proximal end of the distal most device support 79a housed in the distal most device module 32a. In addition, an introducer interface support (redirector) 74 may be connected to the device support connection 72 and an EMD (e.g., an introducer sheath). The configuration of robotic drive 24 has the benefit of reducing volume and weight of the drive robotic drive 24 by using actuators on a single linear member.

To prevent contaminating the patient with pathogens, healthcare staff use aseptic technique in a room housing the bedside unit 20 and the patient 12 or subject (shown in FIG. 1). A room housing the bedside unit 20 and patient 12 may be, for example, a cath lab or an angio suite. Aseptic technique consists of using sterile barriers, sterile equipment, proper patient preparation, environmental controls and contact guidelines. Accordingly, all EMDs and interventional accessories are sterilized and can only be in contact with either sterile barriers or sterile equipment. In an embodiment, a sterile drape (not shown) is placed over the non-sterile robotic drive 24. Each cassette 66a-d is sterilized and acts as a sterile interface between the draped robotic drive 24 and at least one EMD. Each cassette 66a-d can be designed to be sterile for single use or to be re-sterilized in whole or part so that the cassette 66a-d or its components can be used in multiple procedures.

In one example, various types of data during a procedure performed by an operator may be captured and used to generate a profile associated with various characteristics. The various types of data are associated with inputs from the operator that may be received through a user interface and captured by a sensor system. The captured data can be used to generate one or more profiles which can later be used to facilitate operation of the robotic medical system by the same or different operator.

In another example, the captured data may be used to provide adaptive guidance during training, simulation or live procedures by the same or different operators. As described in the various examples below the guidance parameters may include limits on operation of the robotic medical system or other manners of guidance.

Definitions

In various examples, the operator inputs are captured by a sensor system in the form of waveforms (in time domain), commands, signals, and settings. These data are then processed by processing unit 124 (FIG. 4) and different mappings and conversions such as filters, Fourier transforms, and other mathematical or numerical are applied to, in order to make them operationally useable. When data capture system is part of robotic medical system, motion parameters, load parameters, motion and load profiles and limits, successful and unsuccessful attempts (such as number of attempts to select a branch), total travel of each EMD, and other such parameters are examples that are captured during a case or a data capture episode. Additionally, other data regarding operator characteristics, and the procedure (case) can be used to better represent, describe, classify or segment the data. The latter is often called metadata.

In various examples, a profile may include a collection of data associated with a user or group of users. This data could be a collection of metadata, collected kinematic or dynamic (or motion or load) parameters, or derived parameters from algorithms processing the metadata and kinematic or dynamic parameters. Kinematic parameters refer to mathematical representations of points, bodies, or systems of bodies motion such as displacement, velocity, acceleration, time and frequency (frequency=1/time), and trajectory. This does not consider the loads required to move the devices. Dynamic parameters refer to mathematical representations of points, bodies, or systems of bodies motion such as displacement, velocity, acceleration, time and frequency (frequency=1/time), and trajectory considering the loads required to move the devices and the external loads (or losses) experienced by the devices or manipulators moving the devices. A profile pertaining to a robotic EMD drive system may include relevant force zones (typical, high, max), relevant force zones further classified for type of procedure, type of device being driven, device location within the anatomy, etc., velocity thresholds or limits, load thresholds or limits, power thresholds or limits, or typical devices (device lengths) used.

In some examples, data associated with the operator, referred to as physician metadata, is also captured by the robotic system and used for processing and presentation of the collected data. Examples of physician metadata may include, but not limited to, name, age, organization, years of experience, number of cases per year, number of total cases, techniques/procedures used (e.g., use of aspiration or stent retriever in mechanical thrombectomy), preferred devices (e.g., regular guide catheter or sheath vs. balloon guide catheter), risk tolerance, and patient population acuity.

A subset of metadata representing data that can be collected from a medical procedure or training case is referred to as case metadata. Examples of case metadata may include, but not limited to, procedure length (time), subsets or different use cases performed within the procedure, procedure date, devices used, treatment techniques/order of operations, patient age, case type, treatment location, access location (femoral, radial, carotid, etc.), contrast used, radiation emitted (fluoroscopy time), images taken (e.g. live and reference fluoro images), robot manipulation time, robot device loading time, robot setup time, robotic moves, loads, outcome and clinical assessment indices before, during, and after treatment.

As used herein, the term motion parameters refers to kinematic parameters and include translational and rotational displacement, velocity, acceleration as well as the time history of those parameters (i.e., displacement(t), velocity(t), acceleration(t)) and any functions of those parameters such as frequency of displacement, velocity, and acceleration. The motion parameters can be integrated or differentiated with respect to time to obtain other motion parameters. For example, velocity can be determined by differentiating displacement data with respect to time, acceleration can be determined as the second derivative of displacement with respect to time, velocity can be determined as integral of acceleration over time, and displacement can be determined as integral of velocity over time.

In various examples, the data capture system includes a sensor system that includes sensors to detect motion and/or load parameters and a data acquisition system to record and/or display the output of sensors. The data acquisition system may be equipped with a reference timing unit to record time associated with each data point. Also, it may be equipped with a signal conditioning unit to filter and amplify signal. The sensor system may include motion sensors and load sensors. The motion sensors are sensors that detect motion parameters. Contact motion sensors include but are not limited to accelerometers, LVDTs, encoders which are connected to the EMD directly or indirectly. Contactless motion sensors include but are not limited to CMOS sensors, optical encoders, ultrasonic sensors, standard or high-speed cameras. Load sensors are sensors that measure force and/or torque.

In various examples, data capture system is able to capture motion parameters. motion parameters are equivalent to kinematic parameters and include linear and rotational displacement, velocity, acceleration as well as the time history of those parameters (i.e., displacement(t), velocity(t), acceleration(t)) and any other products and derivatives of those parameters such as frequency of displacement, velocity and acceleration. The data capture system captures motion parameters along with time so that the time history of each of those parameters is also captured. The motion parameters can be integrated or differentiated with respect to time to obtain other motion parameters. For example, velocity can be found by differentiating displacement data with respect to time, acceleration can be found as the second derivative of displacement with respect to time, velocity can be determined as integral of acceleration over time, and displacement can be determined as integral of velocity over time.

Data capture system is able to capture load parameters which include force and torque parameters as well as the time history of those parameters (i.e., force(t), and torque (t)). The data capture system captures load parameters along with time so that the time history of each of those parameters is captured.

In one example, data capture system can capture the effort (e(t)) and flow (f(t)) simultaneously to measure power. Measured power can be used to form the power profile. In mechanical domain, the power is product of force (F(t)), and velocity (V(t)), or in rotational form, product of torque (t), and angular velocity ω(t). In electrical domain it can be calculated from product of voltage (v(t)) and current (i(t)). Power can be transformed between energy domains and models used to describe the flow of power within a multi-domain system (typically represented in bond graphs) can also include resistance (R), inertance (I), and compliance (C) components. For a linear mechanical system, effort is force and flow is velocity. For an angular mechanical system, effort is torque and flow is angular velocity. For an electromagnetic system, effort is voltage and flow is current.

The target operator, or a reference operator, for the data capture system as well as medical robotic system is an individual who is experienced in performing medical procedures such as an interventionalist or radiologist or surgeon. However, for the purpose of comparison, the data pertinent to other type of operators can be captured. Further, a reference operator may be the individual from whom the data is captured. A reference operator may include, but not limited to, an experienced physician who is skilled in vascular interventions.

The data processing unit creates one or more profiles from the captured data and metadata. Motion profile is formed by one or a combination of multiple motion and/or load patterns associated with manipulation of EMDs which are referred to as techniques in literature such as synchronized motions (e.g. drilling technique). A master profile may be formed using any combination of smaller profiles such as motion profile, power profile, load profile, case metadata, and physician profile.

In some examples, captured data may be used to provide adaptive guidance during training, simulation or live procedures by the same or different operators. In various examples, a system may provide guidance by providing information to an operator or applying limits and rules to the operator. The operator may be able to override certain guidance but not certain other limits or rules. Examples may include operational limits (e.g., on loads, and speeds, on displacements, etc.) or limits on the order of steps, on the devices to be used, or combination of motions for certain cases.

The term adaptive guidance refers to active and responsive guidance provided to an operator during a procedure. It may be used during training, simulation, or live procedures by the same or different operators. The content and type of guidance may be updated over time as the operator gains more experience, or as devices improve and new technologies emerge, etc. The guidance that the system provides to the operator may include limits and rules that are within the context of a procedure performed. The operator may be able to override certain guidance and not override other guidance, such as certain limits or rules. Examples include operational limits (e.g., on loads, speeds, displacements, etc.) or on the order of steps, or on the devices used, or the combinations of motions for certain cases.

Data Capture System

Figure 4:
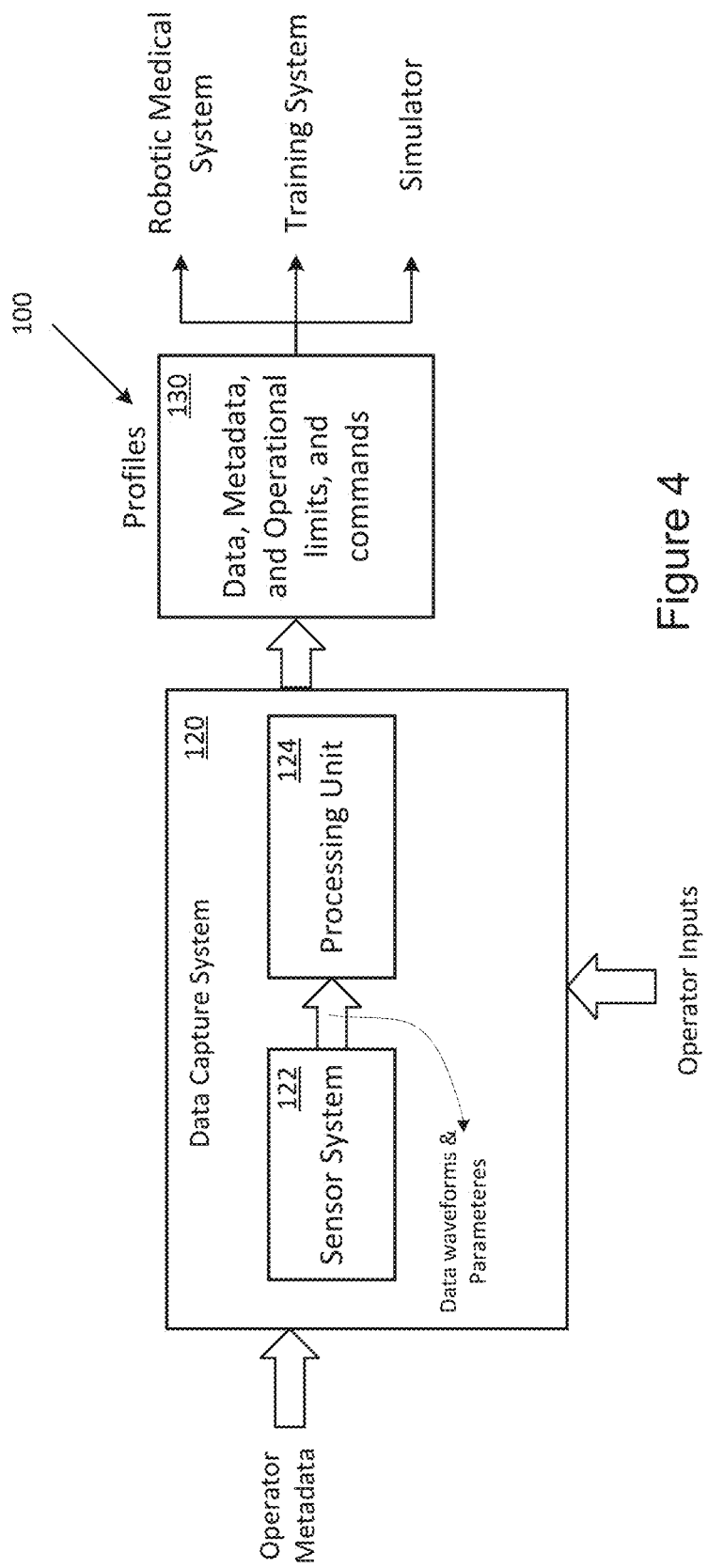
FIG. 4 is a schematic illustration of an example data capture system for use with a robotic medical system having an elongated medical device (EMD) in accordance with an embodiment.

The various examples may be implemented on a system 100 as illustrated in FIG. 4. The example system may be a stand-alone system or can be implemented as part of a robotic medical system, such as the system 10 described above with reference to FIGS. 1-3. For example, the example system 100 of FIG. 4 may be implemented as part of the bedside unit 20, the control station 26 and/or the control computing system 34 of the system 10.

Figure 5:
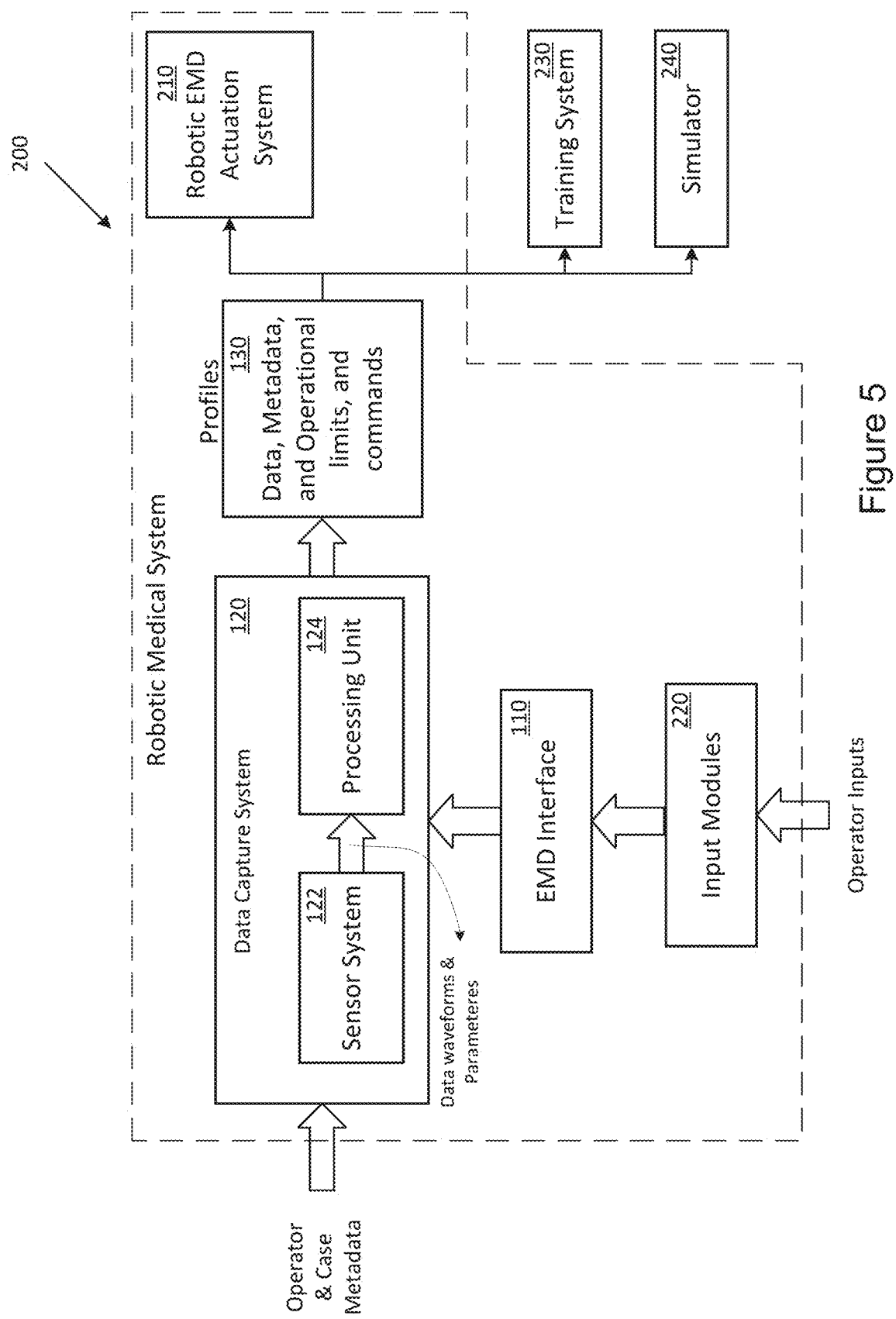
FIG. 5 is a schematic illustration of an example robotic medical system with an example data capture system in accordance with an embodiment.

The data capture system 120 of FIG. 4 includes a sensor system 122 and a processing unit 124. As illustrated in the example of FIG. 5, the data capture system 120 can further include a device (EMD) interface 110. Various examples of the EMD interface 110, the sensor system 122, and the processing unit 124 are described below in further detail.

EMD Interface

The example system 100 includes an EMD interface 110 to receive inputs from an operator, such as a practitioner, through input modules 220. As described below with reference to FIG. 5, input modules 220 may include various types of input devices, such as joysticks or other tactile input devices. The EMD interface 110 manipulates EMD(s) based on commands received from the Input Modules 220. The commands are created by the input modules 220 based on operator inputs to the Input Modules 220 and are transmitted to the EMD interface 110. The EMD interface 110 may be a part of the robotic drive 24, and input modules 220 may be a part of control station 26 of the example system 10 described above with reference to FIGS. 1-3. Various examples of the EMD interface 110 are described below in further detail.

In one embodiment, the data capture system 120 is coupled to the robotic medical system which may include elongated medical device (EMD). The robotic medical system may be similar to, or part of, the bedside unit 20 described above with reference to FIGS. 1-3. For example, the robotic EMD may include the robotic drive 24 of the bedside unit 20.

As noted above, the data capture system 120 of the example system 100 may be implemented in a robotic medical system. In various examples, the data capture system 120 may be implemented within various portions of the robotic medical system. For example, in the example system 10 of FIGS. 1-3, certain portion of the data capture system 120 may be provided in the control station 26, the bedside unit 20 (e.g., within the robotic drive 24), or in the control computing system 34. For example, the sensor system 122 may be implemented within the device modules 32, and the processing unit may be implemented within the control station 26.

In one example, as illustrated in FIG. 5, the data capture system 120 can be a part of the robotic medical system 200 of the example system 10 described above. Such a data capture system can be used to capture load and motion parameters applied to EMDs during a robotic vascular intervention procedure. The robotic system 200 has the input modules 28 to receive motion commands for EMDs from the operator. In this regard, a mechanical input from the operator (e.g., motion of a control) is coupled and transferred to a corresponding output or command (e.g., movement of a catheter). In another example, a digital input of the operator is received by the input modules 28 to actuate the EMD(s) accordingly. In this regard, inputs from the operator may be received as, or converted to, digital signals. The signals may be transmitted through, for example, the control computing system 34 of the robotic system 200. The robotic drive 24 of medical robotic system 10 actuates the EMDs based on the motion commands received from the input modules 28. The data capture system 120 of the robotic system 200 includes the sensor system 122 to detect load and motion parameters applied to the EMDs actuated by the robotic drive 24. The data capture system 120 also has a processing unit (processing unit 124) to record and post-process the captured data. The processing unit 124 process the captured data and combines it with case metadata and physician metadata to generate operator profiles. The processing unit 124 can further process the profiles to generate operational rules/limits. The robotic system 200 may use the newly generated rules/limits to update the existing operational rules/limits defined for the robotic system 200. The robotic system 200 allows the operator to override the operational rules/limits by entering digital values of the characteristic parameters and/or by applying physical/mechanical inputs onto the EMD interface which is coupled to the data capture system 110.

Sensor System

As illustrated in the example of FIG. 4, the data capture system 120 includes a sensor system 122 and a processing unit 124. The sensor system 122 may include one or more sensors to detect motion and/or load parameters applied to EMDs associated with inputs from the operator and a mechanical fixture to interface with EMDs. Although sensor system 122 and processing unit 124 are both a part of data capture system 120, they can be physically in different locations and operate at different times. Various types of sensors may be provided to detect a variety of parameters. For example, sensors may be provided to detect motion (e.g., linear displacement, linear velocity, linear acceleration, rotational displacement, rotational velocity, or rotational acceleration) or load (e.g., linear force or rotational torque). Various sensors may be able to detect other parameters such as frequency of input, for example.

In one example, the sensor system 122 is provided to capture motion and load parameters of EMDs while the EMDs are manipulated directly by the operator. Thus, the sensor system 122 may be able to detect the force or torque applied by the operator or the motion parameters (e.g., displacement, velocity, acceleration) introduced by the operator. In other examples, the parameters detected by the sensor system 122 may be related to responses by the EMD to the inputs by the operator. For example, the sensor system 122 may detect the displacement, velocity, acceleration, or reaction load of a catheter in response to an operator input.

Any of a variety of sensors may be provided in the sensor system 122. For example, the sensor system 122 may include contact sensors and/or contactless (or non-contact) sensors. Contact sensors may include, without limitation, accelerometers, linear variable differential transformers (LVDTs), encoders or load sensors such as piezoelectric sensors, or strain gage-based sensor, which are connected to the EMD directly or indirectly. Contactless sensors may include, without limitation, complementary metal-oxide-semiconductor (CMOS) sensors, non-contact optical encoders, ultrasonic sensors, standard or high-speed cameras, optical-based load sensors, or magnetic-based load sensors. In one example, the sensor system 122 may condition the signals from the sensors to facilitate use by the processing unit 124. For example, the sensor system 122 may perform a smoothing function, such as root-mean-square (RMS), to eliminate fluctuations or perturbations in the signals from the various sensors. In another example, the signal conditioning unit may be equipped with a low-pass filter and/or amplifier to filter high frequency noise from the signal and amplify signal respectively.

The data captured by the sensor system 122 may be stored for processing by the processing unit 124 or another processor. In this regard, the data may be stored on a storage device of the data capture system 120 or an external storage device that is independent of the data capture system 120. The stored data may be retrieved when desired from the storage device.

In one example, the data capture system has a timing unit such as a hardware clock source that reports time associated with each data point. Sensor's data points are stored along with their corresponding time. In one example, the data is stored at a constant sampling rate which means that the time between each data point is constant and is known from the timing source. Therefore, data is stored as a function of time (e.g. displacement(t), velocity(t), acceleration(t), force(t), torque(t)) and the time history of each of the sensed parameters is available for further processing. By further processing of the data, secondary parameters that were not directly measured are found. As an example, frequency of displacement, velocity and acceleration can be determined by having the time history of those parameters. As another example, velocity can be found by differentiating displacement data with respect to time, acceleration can be found as the second derivative of displacement with respect to time, velocity can be determined as integral of acceleration over time, and displacement can be determined as integral of velocity over time. The sampling rate can be adjusted based on the frequency of the parameter being sensed.

The sensor system 122 may include any of a variety of sensors to capture the desired parameters associated with user inputs. The sensor system 122 is provided to accurately capture and record dynamic motions and loads that a physician would use when proximally manipulating a device. In this regard, the main measurements are force, torque, and their rate of changes, displacements, linear velocity and acceleration, rotational velocity and acceleration.

In one example, measurement of force may be achieved using a sensor system including a force sensor and a mechanical fixture to interface with an EMD. The bottom of force sensor is fixed to a base plate (ground). The mechanical fixture is attached to the force sensor to provide a frictional interface with the EMD which is mounted on top of the sensor for force measurements. The interface to the EMD may depend on the geometry of the EMD and the clinical case scenario that is desired to be captured. For example, the frictional interface may include a spring-loaded frictional clamp. The frictional clamp is made from a material that allows smooth slide of the EMD through the frictional clamp. To prevent buckling of the EMD, the EMD is supported in lateral directions. As an example, design, two rows of dowel pins may be used as guides for the EMD to provide support. The mechanical fixture used as the interface to the EMDs is designed to apply adjustable resistive loads on EMDs while the operator is manipulating the EMDs and load and motion parameters are being sensed and stored. The resistive loads may be adjusted by the operator in order to simulate different load and motion scenarios occurring in actual vascular intervention cases such as in-human manual procedures.

In one example, measurement of torque may be achieved using one or more modules to measure torque on EMDs that can be torqued. Like the force measurement module, the torque measurement module includes an interface, and a sensor. The sensor is capable of measuring torque directly or by converting reaction forces to torque. The torque sensor is provided to allow continuous rotation of the EMD as an adjustable torque resistance is applied to it or to simulate an EMD with a certain compliance while the distal end is stationary due to high torque resistance or being caught on something. In another embodiment, the motor or actuator current can be used to calculate the load applied to EMD.

Profile Generation

As noted above, usage of the robotic medical system by one or more operators may be used to facilitate operation of the robotic medical system. In this regard, the processing unit 124 of the data capture system 120 is provided to process the parameters captured by the sensor system 122 to facilitate future or further operation of the EMD. In one example, the data captured by the sensor system 122 is used to generate a profile and to associate the profile with a characteristic of the operator (physician metadata) and/or to associate the profile with a characteristic of the case (case metadata). As illustrated in FIG. 4, the profiles along with association of the profiles with various parameters may be stored in a profile module 130. The profiles may be used to facilitate operation of various devices for training, simulation or live procedures through training systems, simulators, or robotic medical systems, respectively.

Figure 6:
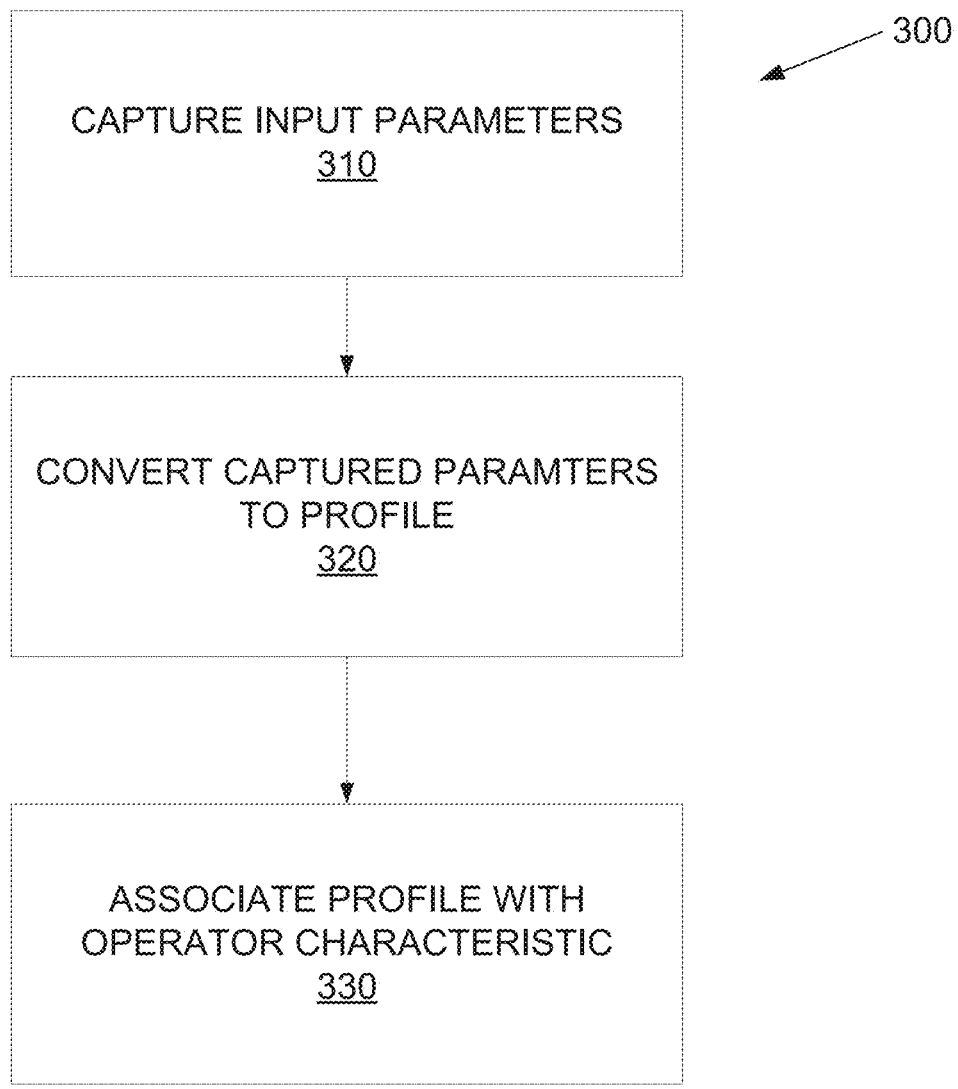
FIG. 6 is a flow chart illustrating an example method for using operator inputs to generate a profile associated with an operator characteristic in accordance with an embodiment.

A method of generating the profile and associating the profile is illustrated in FIG. 6. In the example method 300, parameters associated with user inputs are captured by, for example, the sensor system 122 of the data capture system 120 (block 310). The captured parameters may be associated to any of a variety of inputs or combination of inputs. In one example, the parameters are associated with individual user inputs, which may be any variety of motion or load parameters. For example, the captured parameters may be associated with individual linear velocity, linear force, rotational velocity, or rotational torque. In one particular example, the captured parameters may be associated with individual inputs in the six degrees of velocity and six degrees of force/torque. Thus, the sensor system 122 may break the measurements into different modules that can be positioned on a table top. Like a clinical setting, physicians may operate while standing at a table, with each sensor module positioned where the patient would be relative to the physician. The sensor data may be collected at the proximal end of the EMD, where the EMD is being manipulated by the operator.

In another example, the captured parameters may be associated with various combinations of user inputs. In one particular example, the captured parameters are associated with a combination of linear velocity and rotational velocity (e.g., a drilling motion), a combination of linear force and rotational torque, a combination of linear velocity and linear force, and/or a combination of rotational velocity and rotational torque. When a combination of load and velocity is captured, new product parameters can be determined, such as a power parameter which is the product of load and velocity. In various examples, various parameters of the combinations are measured simultaneously.

In still another example, the captured parameters may be associated with various combinations of any number of user inputs. For example, the captured parameters may be associated with a combination of any linear motion, linear load, rotational motion and/or rotational load.

In one example the data capture system 120 capture parameters from one EMD. In this case, one or multiple EMDs can be nested/assembled to represent the actual setting of EMDs during an actual procedure, however, the motion and load parameters are captured from a single EMD. In another example, more than one EMDs are nested/assembled and the sensor system 122 uses sensors to capture concurrent data from more than one EMDs. As an example, the data capture system captures the relative motions of two or more EMDs (known as differential motions) and/or relative loads of two or more EMDs such as differential forces and torques.

Referring again to the example method 300 of FIG. 6, the captured parameters are converted to at least one profile (block 320). In one example, the processing unit 124 may generate the profile based on captured data associated with a single reference operator. In this regard, the profile may be based on a single or multiple procedures performed by the reference operator. The profile may be updated or modified with each subsequent procedure performed by the reference operator. In this regard, the processing unit 124 may utilize an algorithmic analysis of the inputs from one or more operators in forming profiles.

In other examples, the processing unit 124 may generate the profile based on captured data from multiple operators. In one example, the captured data associated with the reference operator may be combined with captured data associated with other operators. The processing unit 124 may generate a profile based on an experience level or other characteristic by using an algorithmic analysis to combine data associated with multiple operators. In one example, the data from each operator may be weighted based on each operator's characteristics. For example, an operator with a higher experience level may be weighted greater than another operator with a lower experience level. The weighting may also be used to generate profiles for a specific experience level. For example, a profile for n years of experience may be generated by weighting operators with close to n years of experience greater than operators with fewer years of experience. Thus, in one example, separate profiles may be generated for experience levels of about 5 years, about 10 years, about 15 years, and so forth. For the profile corresponding to 15 years of experience, operators with 10 years of experience may be weighted higher than those with 5 years of experience. Similarly, weighting may be applied to provide profiles associated with any of a variety of operator characteristics. In one example, the profile is based on a combination of characteristics of reference operators, patient characteristics, anatomical data, physiological data, endovascular device characteristics, procedure characteristics, technique characteristics, imaging data, and procedure outcomes. A profile may be updated or generated by combining the data with additional data associated with other practitioners, procedures or patients. In one example, the profile may be regularly or continuously (on an on-going basis) updated with successive procedures.

In one example, the profile generated by the processing unit 124 is a power profile based on the motion and load parameter associated with inputs from the operator. In one example, the profile may include power in six dimensions (three linear dimensions and three rotational dimensions) throughout a procedure. In this regard, the profile may be a continuous profile for each point in the procedure or may include discrete points at various phases of the procedure. In one example, the profile generated by the processing unit 124 may be based on a heuristic model. The heuristic model may be based on capturing of data from one or multiple procedures.

Referring again to the example method 300 of FIG. 6, the profile is associated with a characteristic of an operator (block 330). In one example, the profile is associated with meta-data of an operator. For example, the captured data may be associated with the identity (e.g., name), age, experience level, or specialty of the operator. In other examples, the captured data may be associated with the procedure during which the data was captured. In this regard, the captured data may be associated with anatomy, a patient characteristic, device specifications, type of procedure, technique used or procedure outcome. In other examples, the profile may be associated with metadata of the case for the procedure. For example, the case metadata may include an anatomy, anatomical location, a patient characteristic, device type, device specifications, type of procedure, a specific part of the procedure, physician specifications (e.g., name, age, number of cases per year, specialty and experience), techniques used, or procedure outcome.

The example method 300 of FIG. 6 may be implemented on a computer or another electronic device. Further, the various steps of the example method 300 may be implemented as instructions that are stored on a non-transitory computer-readable medium. The instructions may be executed by a processor of a computing system.

Adaptive Guidance

In the example described above, processing unit 124 uses the data captured by the sensor system 122 to generate a profile associated with a characteristic of the operator. In another example, the data captured by the sensor system 122 is used to generate guidance parameters which can facilitate use of the robotic EMD by operators for future procedures, for example. For example, data captured from a reference operator or a group of operators may be used to generate guidance parameters associated with motion, load or power parameters associated with user input. The guidance parameters may translate to, for example, limits on linear velocity, linear force, rotational velocity, rotational torque or any of a variety of other parameters. In another example, the adaptive guidance can be done through rules and relations between more than one parameter. For example, the limit on velocity can be a function of the load acting on the EMD. In such an example, the maximum allowable velocity can be decreased when loads are considered to be high to enhance safety of the procedure. In one example, the limits are imposed uniformly throughout an entire procedure. In another example, the limits are imposed variably throughout the procedure. Further, the guidance parameters may vary based on any of a variety of factors including, but not limited to, position of the elongated medical device relative to a human body, procedural context, age of patient, direction of movement of the EMD, or level of load applied by the operator.

Figure 7:
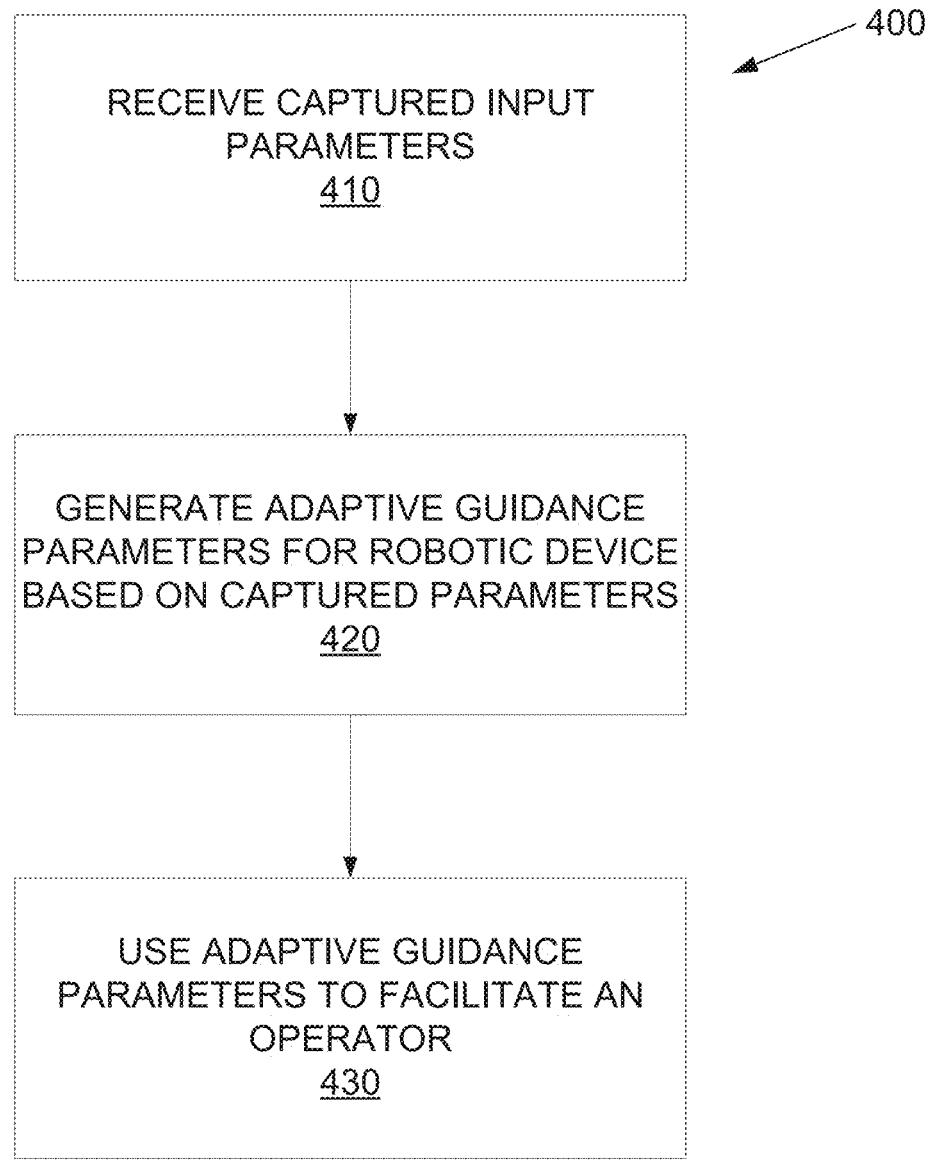
FIG. 7 is a flow chart illustrating an example method for using operator inputs to generate adaptive guidance parameters in accordance with an embodiment.

An example method associated with the adaptive guidance is illustrated in FIG. 7. In accordance with the example method 400, captured parameters associated with user input are received for processing (block 410). As noted above, the captured parameters may be associated with the inputs from one or more practitioners and may be based on detection by a sensor system. The captured parameters may be stored in a memory device or transmitted to a processor, such as the processing unit 124.

In accordance with the example method 400 of FIG. 7, the captured parameters are used to generate adaptive guidance parameters for use with a robotic medical device (block 420). In one example, the processing unit 124 may generate guidance parameters which define an operational envelope associated with, for example, procedural characteristics, patient characteristics, or operator characteristics. For example, the guidance parameters may determine linear velocity limits that are based on the experience level of the operator. In this regard, the guidance parameters may define stricter limits for a less experienced operator and relaxed limits for a more experienced operator. In other examples, the guidance parameters may determine limits that are based on the age of the patient. In this regard, the limits may be stricter for a very young or very old patient.

Similarly, the guidance parameters may depend on the phase in the procedure. In one example, the adaptive guidance parameters provide constant guidance level throughout the procedure. For example, the adaptive guidance parameters may provide limits on various inputs (e.g., force, torque, linear velocity, or rotational velocity) that are constant at each phase of the procedure. In other examples, the limits may be varied throughout the procedure. For example, the limits on linear velocity may be stricter when near a vulnerable anatomy and relaxed otherwise.

The adaptive guidance parameters may be used to facilitate operation of the robotic medical device by an operator (block 430). In this regard, the operator may be provided with alerts or other manner of guidance during a procedure based on the guidance parameters.

Further, in various examples, the operator may be provided with an option to either accept or override the limits defined by the guidance parameters. One or more restrictions (e.g., limits) may be sufficiently critical to no allow the option of being overridden, while other restrictions are allowed to be at the discretion of the operator.

As noted above, the guidance parameters may be reflected as limits in some examples. In other examples, the guidance parameters may be reflected as operational rules, governing equations, procedural recommendations, motion profiles, rule-based motion and load values or any of a variety of other forms. Motion profiles may include synchronized motions associated with inputs from the operator. Various profiles may be based on a database associated with inputs of an operator and may be indicative of synchronized motion patterns associated with one or more EMDs from the operator's inputs.

In one example, the adaptive guidance parameters may be revised or updated by based on additional data associated with other practitioners, procedures or patients. In one example, the adaptive guidance parameters may be regularly or continuously (on an on-going basis) updated with successive procedures. For example, limits on various operator inputs may be tightened or relaxed based on additional procedural data.

As with the example method 300 of FIG. 6, the example method 400 of FIG. 7 may be implemented on a computer or another electronic device. Further, the various steps of the example method 400 may be implemented as instructions that are stored on a non-transitory computer-readable medium. The instructions may be executed by a processor of a computing system.

Robotic System With Data Capture System

Referring now to FIG. 5, a schematic illustration of an example robotic medical system with an example data capture system in accordance with an embodiment is illustrated. In this regard, while FIG. 4 illustrates a system 100 that may be provided as a stand-alone system that may be coupled to a robotic EMD, FIG. 5 illustrates a robotic medical system 200 with the data capture system implemented therein.

Thus, the robotic medical system 200 of FIG. 5 is provided with a data capture system 120 and an EMD interface 110. Similarly, the data capture system 120 includes the sensor system 122 and the processing unit 124 of the data capture system 120 of FIG. 4. In addition, the robotic medical system 200 is provided with one or more EMDs that are controlled through a robotic drive 24. The robotic drive 24 is responsive to commands from the input modules 220.

In turn, the EMD interface 110 may be responsive to operator inputs received through input modules 220. Input modules 220 may include physical, or tactile, input devices controlled by the operator. The operator inputs to the input modules 220 may be converted to mechanical or digital inputs into the EMD interface 110.

The example robotic medical system 200 of FIG. 5 may be similar to the system 10 described above with reference to FIGS. 1-3 and may include a bedside unit and a control station. The input modules 220 and a part of the data capture system 120 may be provided in the control station, while the one or more EMDs are provided on the bedside unit.

In one example, the robotic medical system 200 is provided with a single EMD. In other examples, the number of EMDs may be selected for a particular purpose or procedure. Multiple EMDs may be arranged in series, in parallel, or in any other desirable arrangement. In one example, with multiple EMDs arranged in series, user inputs may be applied to the first EMD in the series, and commands are relayed through the first EMD to additional EMDs situated downstream. In another example, with multiple EMDs arranged in parallel, user inputs from an operator are provided directly to each EMD. Of course, some examples may include multiple EMDs arranged in a combination of series and parallel. In systems with multiple EMDs, the EMD interface 110 and input modules 220 allow concurrent operation of the multiple EMDs by the operator. Similarly, the sensor system 122 is capable of concurrently detecting and capturing motion and load parameters applied to multiple EMDs by the robotic system in association with operator inputs.

The robotic medical system 200 of FIG. 5 is provided with the data capture system 120 and the EMD interface 110 to have the ability to perform the profile generation and the adaptive guidance described above with reference to FIG. 4. Of course, the generation of the profile and the generation of the adaptive guidance parameters may be performed in conjunction with training, simulation, or live procedures. Further, the generation of the profile and the generation of the adaptive guidance parameters may be performed as batch functions following capture of the data from during the procedures. In some examples, the capturing of the data, the generation of a profile and the generation of adaptive guidance parameters may each be performed on the same robotic medical system 200 or on different systems 200. Further, the profiles and adaptive guidance parameters generated based on data captured on one robotic medical system 200 may be used to facilitate operation of other robotic medical system 200 and/or manipulation of EMDs in manual cases. In this regard, once the profile and/or adaptive guidance parameters are generated, they may be disseminated for use by operators of various other robotic medical systems 200 and/or operators of manual procedures.

As noted above, the data capture system 120 of the robotic medical system 200 may be coupled to the control computing system 34 of the robotic medical system 200 to generate and/or update profiles and operational rules and limits. In other examples, the data capture system may be coupled to a training system 230 or a simulator 240 to facilitate training of various operators.

Figure 8:
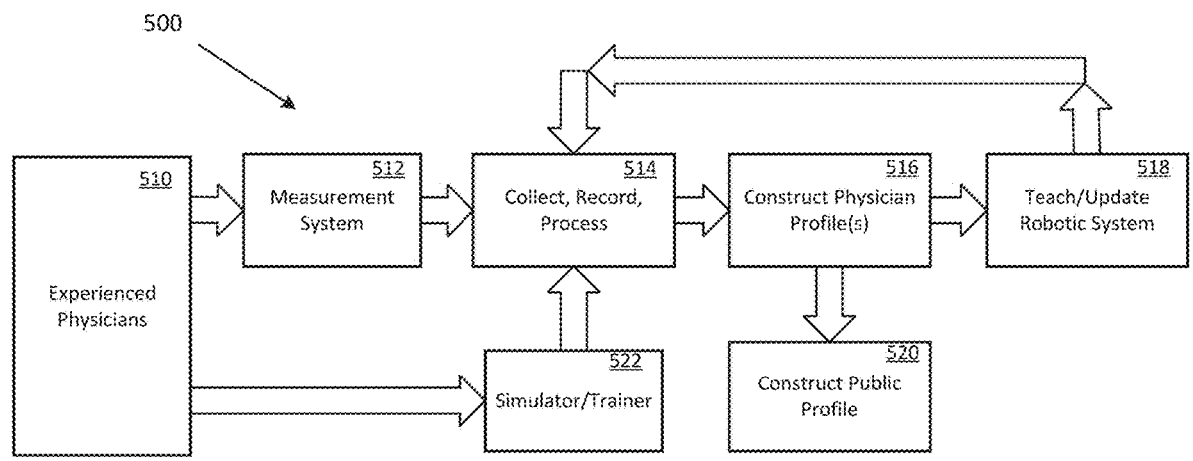
FIG. 8 illustrates an example data input arrangement and data utilization of a robotic medical system with an EMD in accordance with an embodiment.

Referring now to FIG. 8, an example data input arrangement and data utilization of a robotic medical system with an EMD in accordance with an embodiment is illustrated. The example arrangement 500 illustrates the flow of data using an example data capture system 100 of FIG. 4 or a robotic medical system 200 of FIG. 5. As illustrated in FIG. 8, data from experienced physicians 510 may be captured through a measurement system 512 (e.g., the sensor system 122 of FIG. 5) during a live procedure. Data may alternatively be collected during a training session or a simulation on a simulator/trainer 522. The captured data is collected, recorded and processed 514. The captured data may be used to generate a physician profile 516. One or more physician profiles 516 may be used to generate a public profile. For example, as described above, a public profile may be generated for association with a specific experience level.

The new captured profile may be used to update operational rules and limits 518. In this regard, the robotic medical system may use the profiles to teach or guide other operators or to limit various parameters of the robotic medical system.

As indicated in FIG. 8, a feedback loop may be provided wherein the use of the robotic system may be used to collect, record or process additional data. The additional data may be used to update the physician profile on an on-going basis.

In one example, the robotic medical system can be used to obtain limits on load and motion parameters applied to EMDs for robotic operations. EMDs can be damaged during manipulation by an operator under a certain load, for example, due to buckling, kinking, fracturing. The appropriate range of load and motion parameters such as force, torque, velocity, acceleration, displacement as well as combination of these parameters depend on the mechanical characteristics of the EMD as well as the boundary condition of the EMD, for example, how the EMD is supported. For an EMD that is being manipulated by a robotic system, in addition to mechanical characteristics of the EMD, the appropriate range of load and motion parameters to avoid damaging the EMD depend on the design and characteristics of the robotic driving system. In an example embodiment, the robotic system 200 of FIG. 5 uses the data capture system to obtain appropriate ranges of load and motion parameters on EMDs while being manipulated by the robotic medical system. The appropriate ranges can be found during tests which can be destructive or non-destructive. The data capture system stores the captured data during such tests and uses the data when the operational rules and limits are being generated for robotic manipulation of the EMDs. For such tests, the data capture system may use one EMD or an arrangement of two or more EMDs. The arrangement may involve serial or parallel manipulation of the EMDs. In addition, the processing unit 130 considers other factors such as constraints of the medical robotic system to revise operational rules and limits. For instance, processing unit 130 may reduce maximum linear and rotational speed of an EMD when delays are present in the system; e.g., due to network latencies associated with remote input modules.

In accordance with an embodiment, the data capture system may concurrently capture one or a combination of two or more of linear and rotational motion parameters and force and torque parameters applied to the EMDs. Such a data capture system can be standalone as shown in FIG. 4 or be coupled to a robotic medical system as shown in FIG. 5.

In one embodiment, the robotic system uses a data capture system which operates in two states. When the robotic system is used to manipulate EMDs through the input modules 220 (for example during a procedure or a simulation), the data capture system operates in the first state. In the first state, the data capture system captures and stores the motion and load parameters applied to the EMDs by the robotic system. In the second state, the EMDs are loaded into the robotic system, however, they are manipulated by the operator directly. In other words, the operator may apply mechanical input to the EMDs while the EMDs are engaged in the robotic system equipped with the data capture system. In the second state, the robotic system does not manipulate the EMDs, instead, it applies an adjustable resistive load to the EMDs resisting its motion. The resistive load applied by the robotic system to the EMD can be adjusted by the operator to create different load scenarios Similar to the first state, the data capture system captures the load and motion parameters applied to the EMDs as the EMDs are being manipulated directly by the user. The robotic system generates profiles and operational rules and limits based on the captured data in state 1, state 2, or a combination of data captured in the two states. Such a robotic system allows for customization of load and motion profiles and operational rules/limits based on mechanical input of the operator on the EMD without requiring an additional standalone data capture system.

As one example of such a robotic system with two states as described above, in state 2, the EMD may be engaged in the device module 32 through a collet. The collet clamps the EMD so that the EMD does not move relative to the collet. Instead, the entire device module 32 is allowed to move linearly with the collet and the EMD in response to a force that is mechanically applied to the EMD by the operator. Also, the collet is allowed to rotate in response to a torque applied by the EMD. Although linear and rotational motion of the EMD is allowed, the actuators create adjustable resistive loads against the motion of the EMD. The data capture system allows for applying independent resistive force and torque to an EMD. As an example, the current of an actuator can be adjusted to adjust the resistive load applied to the EMDs by the device module 32. The load parameters can be determined by measuring the current of the actuators since the load of the actuator is proportional to its current. As another example, a brake may be used on each actuator to create the adjustable load on the EMD. As another example, the device module 32, does not move and only captures load data applied by the operator to the EMD. In another example, sensors may be used to measure load parameters. The sensor used for measuring torque is attached in between the actuator used for rotational degree of freedom and the collet clamping the EMD. The sensor used to measure force may be placed between the collet and the device module 32 or between the device module 32 and the base of the sliding component used for linear degree of freedom of the EMD. As another example, the EMD has an embedded load sensor to measure load parameters.

Example Hardware

Figure 9:
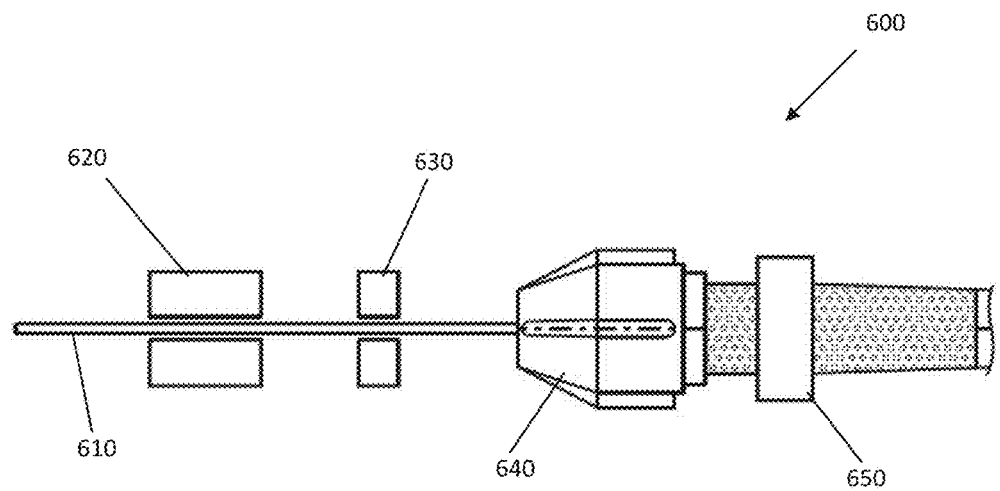
FIG. 9 illustrates an example actuator/sensor arrangement for use with various EMDs in accordance with an embodiment.
Figure 10:
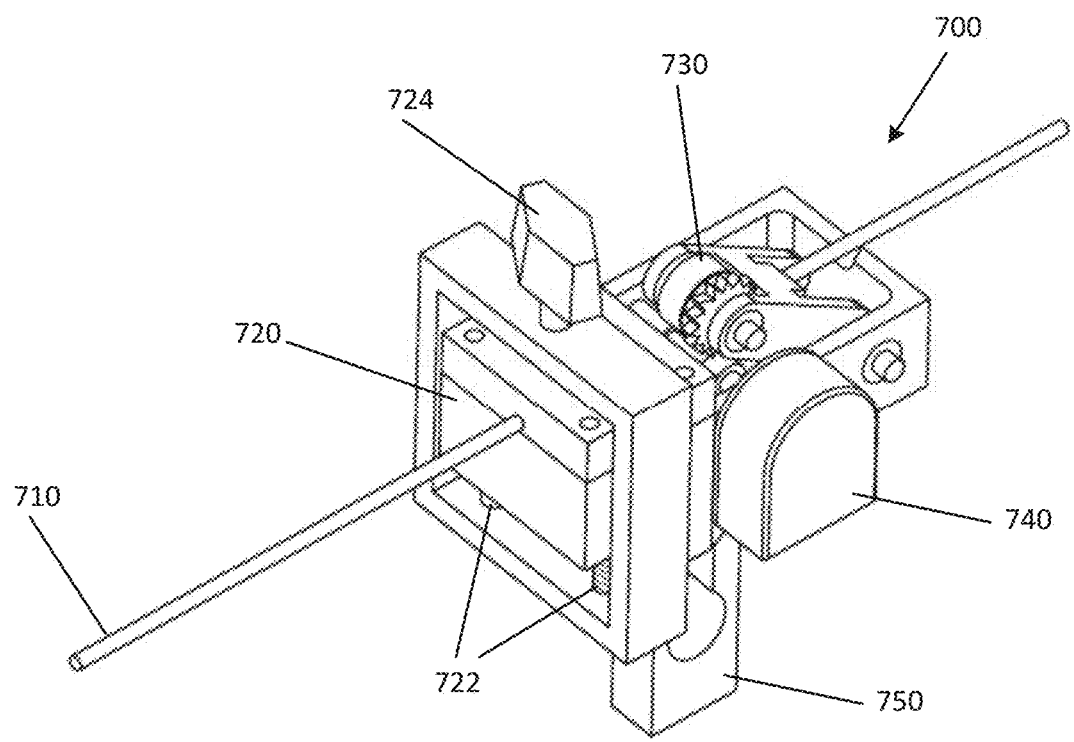
FIG. 10 illustrates an example data capture linear module for use with various EMDs in accordance with an embodiment.
Figure 11:
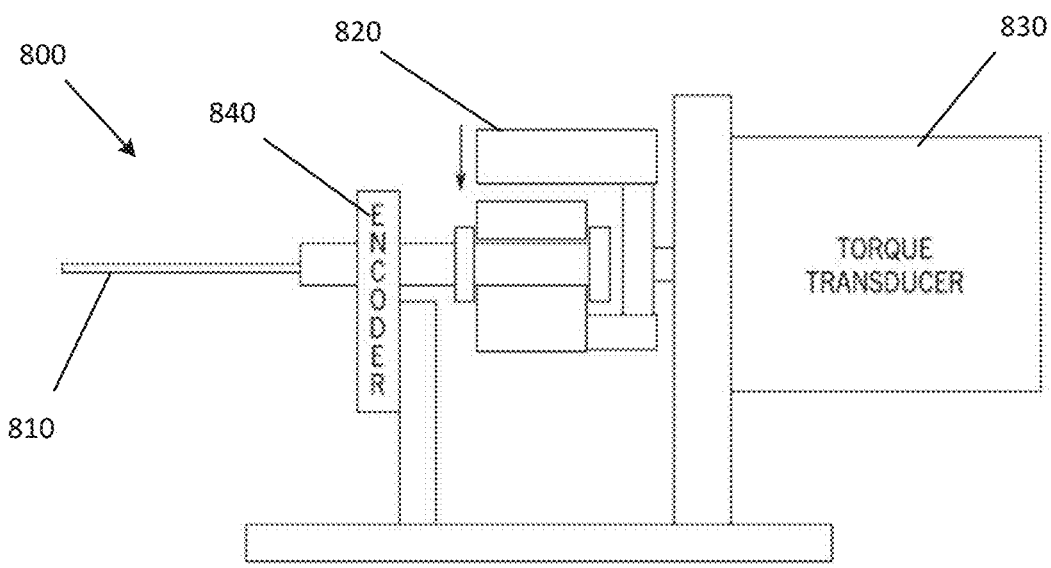
FIG. 11 illustrates an example data capture rotational module for use with various EMDs in accordance with an embodiment.

Referring now to FIGS. 9-11, various examples of hardware are illustrated for use with example robotic medical systems or data capture system described herein. Referring first to FIG. 9, an example actuator/sensor arrangement for use with various EMDs in accordance with an embodiment is illustrated. The example arrangement 600 illustrated in FIG. 9 may be used to measure force and linear velocity with a single module and simultaneously. Further, the example arrangement 600 may be used to measure torque and rotational speed concurrently.

The example arrangement 600 is illustrated with an EMD 610 passing therethrough. The EMD 610 is clamped with an adjustable frictional clamp 620. The clamp 620 may include spring-loaded pads and/or tires pushing against the EMD 610 which allow continuous motion of the EMD 610. The frictional resistance may be adjusted using, for example, a thumb screw, or a motorized system with servo-control. An optical sensor 630 is also used to measure motion parameters of the EMD.

The example arrangement 600 further includes a torquer 640 to clamp the EMD. The operator uses the back side of the torquer (very right side of the torquer in FIG. 9) to manipulate the EMD. The torquer has one or more sensors 650 to measure loads (forces and torques) applied to the EMD through the torquer. The data is captured concurrently from the optical sensor 630 and the sensor 650.

Referring now to FIG. 10, an example linear sensor system module for use with various EMDs in accordance with an embodiment is illustrated. The example linear module 700 is illustrated with an EMD 710 passing therethrough. The example linear module 700 includes a frictional clamp 720. As noted above, the frictional clamp 720 allows continuous motion of the EMD 710 through the linear module 700. The frictional clamp 720 includes springs 722 to provide a clamping force onto the EMD 710. The clamping force can be adjusted using a thumb screw 724.

The example linear module 700 includes an optical encoder 740 to measure linear displacement and/or linear velocity and/or acceleration. The optical encoder 740 is coupled to a pair of tires 730. The pair of tires 730 sandwich the EMD using a torque spring. When the EMD is moved linearly (advanced or retracted), the tires rotate accordingly and the optical encoder 740 measures the rotational speed of the tires. Given the rotational velocity of the tires and by knowing the diameter of the tires, the processing unit 124 of the data capture system 120 determines the linear speed of the EMD. Further, a force sensor 750 is provided to measure the linear force exerted onto the EMD 710.

Referring now to FIG. 11, an example rotational sensor system module for use with various EMDs in accordance with an embodiment is illustrated. The example rotational module 800 is illustrated with an EMD 810 passing therethrough. The example rotational module 800 includes a frictional clamp 820 having a clamping plate which allows continuous rotational motion of the EMD 810 through the rotational module 800. The frictional clamp 820 applies an adjustable torque on the EMD. The resistive torque applied on the EMD can be adjusted for example using a screw. Springs may be used in the frictional clamp 820 to create an adjustable clamping system.

The example rotational module 800 includes an encoder 840, such as an optical encoder, to measure rotational displacement, rotational velocity and/or rotational acceleration. Further, a torque transducer 830 is provided to measure the torque exerted onto the EMD 810. The torque and motion parameters are concurrently captured from the encoder 840 and the torque transducer 830, which can be used to obtain rotational power applied to the EMD.

Computer-executable instructions for the steps of example methods 300 and 400 may be stored on a form of computer readable media. Computer readable media includes volatile and nonvolatile, removable, and non-removable media implemented in any method or technology for storage of information such as computer readable instructions, data structures, program modules or other data. Computer readable media includes, but is not limited to, random access memory (RAM), read-only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium which can be used to store the desired instructions and which may be accessed by system 10 (shown in FIG. 1), including by internet or other computer network form of access.

This written description used examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. The order and sequence of any process or method steps may be varied or re-sequenced according to alternative embodiments.

Many other changes and modifications may be made to the present invention without departing from the spirit thereof. The scope of these and other changes will become apparent from the appended claims.

Clause 1: A data capture system generating profile using captured parameters from a reference operator, comprising a user interface to receive inputs from the reference operator for operation of one or more elongated medical devices (EMDs); a sensor system having sensors to capture parameters associated with the inputs from the reference operator; and a processing unit to generate at least one profile using the captured parameters, the profile being associated with a characteristic of the reference operator.

Clause 2: A robotic medical system, comprising modules to actuate one or more EMDs independently and in concert; a user interface to receive inputs from a reference operator to manipulate the EMD(s); a sensor system having sensors to detect motion and/or load parameters applied to the EMD(s); a data capture portion to capture the parameters detected by the sensors associated with the inputs from the reference operator, the captured parameters including at least one motion or load parameter, wherein the data capture portion is to associate the captured parameters with a characteristic of the reference operator; and a processing unit to convert the detected parameters to operational governing equations for the elongated medical devices and procedure.

Clause 3: A method, comprising capturing input parameters from a reference operator of a robotic device, the captured input parameters including at least one motion or load parameter; converting the captured input parameters to operational commands for the robotic device; and generating a profile using the captured input parameters, the profile being associated with a characteristic of the reference operator.

Clause 4: A non-transitory computer-readable storage medium encoded with instructions executable by a processor of a computing system, the computer-readable storage medium comprising instructions to capture input parameters from a reference operator of a robotic device, the captured input parameters including at least one motion or load parameter; convert the captured input parameters to operational commands, for the robotic device; and generate a profile using the captured input parameters, the profile being associated with a characteristic of the reference operator.

Clause 5: A computer-implemented method, comprising capturing input parameters from a reference operator of a robotic device, the captured input parameters including at least one motion or load parameter; converting the captured input parameters to operational commands for the robotic device; and generating a profile using the captured input parameters, the profile being associated with a characteristic of the reference operator.

Clause 6: A data capture system, comprising a user interface to receive inputs from a reference operator for operation of an elongated medical device, the user interface including sensors to detect parameters associated with the inputs from the reference operator; a recording portion to capture the parameters detected by the sensors associated with the inputs from the reference operator, the captured parameters including at least one motion or load parameter; and a processing unit to generate parameters for adaptive guidance for operation of the elongated medical device based on the captured input parameters.

Clause 7: A robotic medical system, comprising a user interface to receive inputs from a reference operator; a sensor system having sensors to detect parameters associated with the inputs from the reference operator; a data capture portion to capture the parameters detected by the sensors associated with the inputs from the reference operator; a processing unit to convert the inputs from the operator to operational adaptive guidance for elongated medical devices (EMDs) and procedure; and at least one module to actuate one or more EMDs independently and in coordination.

Clause 8: A method, comprising capturing input parameters from a reference operator of an elongated medical device, the captured input parameters including at least one motion or load parameter; converting the captured input parameters to operational commands for the elongated medical device; and generating guidance parameters for the elongated medical device based on the captured input parameters.

Clause 9: A non-transitory computer-readable storage medium encoded with instructions executable by a processor of a computing system, the computer-readable storage medium comprising instructions to capture input parameters from a reference operator of a robotic device, the captured input parameters including at least one motion or load parameter; convert the captured input parameters to operational commands for the robotic device; and generate guidance parameters for an elongated medical device based on the captured input parameters.

Clause 10: A computer-implemented method, comprising capturing input parameters from a reference operator of a robotic device, the captured input parameters including at least one motion or load parameter; converting the captured input parameters to operational commands for the robotic device; and generating guidance parameters for an elongated medical device based on the captured input parameters.

Clause 11: A data capture system generating profile using captured parameters from a reference operator, comprising a user interface to receive inputs from a reference operator for operation of one or more elongated medical devices (EMDs); and a sensor system having sensors to capture parameters associated with the inputs from the reference operator; wherein the parameters detected by the sensors include at least one of (a) a combination of linear velocity and linear force load; (b) a combination of rotational velocity and rotational torque; (c) combination of displacement and/or velocity and/or acceleration and linear force; or (d) combination of angular displacement and/or angular velocity and/or angular acceleration and torque.

Clause 12: A data capture system generating profile using captured parameters from a reference operator, comprising a user interface to receive inputs from a reference operator for operation of one or more elongated medical devices (EMDs); and a sensor system having sensors to capture parameters associated with the inputs from the reference operator; wherein the parameters detected by the sensors include a combination of two or more of motion parameters, load parameters, position, displacement, frequency, linear velocity, linear force, rotational velocity or rotational torque.

Clause 13: The data capture system, robotic medical system, method, non-transitory computer-readable storage medium, or computer-implemented method of any of Clauses 1-12, wherein the parameters detected by the sensors include at least one of motion or load parameters.

Clause 14: The data capture system, robotic medical system, method, non-transitory computer-readable storage medium, or computer-implemented method of any of Clauses 1-13, wherein the motion and load parameters include at least one of displacement, linear velocity, linear force, rotational velocity, rotational torque, acceleration, or frequency.

Clause 15: The data capture system, robotic medical system, method, non-transitory computer-readable storage medium, or computer-implemented method of any of Clauses 1-14, wherein the parameters detected by the sensors include at least one of (a) a combination of linear velocity and linear force load; (b) a combination of rotational velocity and rotational torque; (c) combination of displacement and/or velocity and/or acceleration and linear force; or (d) combination of angular displacement and/or angular velocity and/or angular acceleration and torque.

Clause 16: The data capture system, robotic medical system, method, non-transitory computer-readable storage medium, or computer-implemented method of any of Clauses 1-15, wherein the parameters detected by the sensors include a frequency of manipulation of the EMDs.

Clause 17: The data capture system, robotic medical system, method, non-transitory computer-readable storage medium, or computer-implemented method of any of Clauses 1-16, wherein the parameters detected by the sensors include a combination of two or more of motion parameters, load parameters, position, displacement, frequency, linear velocity, linear force, rotational velocity or rotational torque.

Clause 18: The data capture system, robotic medical system, method, non-transitory computer-readable storage medium, or computer-implemented method of any of Clauses 1-17, wherein the data capture system is standalone or part of another system such as a robotic medical system or a training system.

Clause 19: The data capture system, robotic medical system, method, non-transitory computer-readable storage medium, or computer-implemented method of any of Clauses 1-18, wherein the sensor system includes contact and/or noncontact sensors to detect motion and/or load of an EMD or stack of EMDs.

Clause 20: The data capture system, robotic medical system, method, non-transitory computer-readable storage medium, or computer-implemented method of any of Clauses 1-19, wherein the sensor system may include signal conditioning.

Clause 21: The data capture system, robotic medical system, method, non-transitory computer-readable storage medium, or computer-implemented method of any of Clauses 1-20, wherein the user interface includes more than one EMD and sensors system detects input parameters for concurrent operation of more than one EMD.

Clause 22: The data capture system, robotic medical system, method, non-transitory computer-readable storage medium, or computer-implemented method of any of Clauses 1-21, wherein the parameters are captured based on a heuristic model.

Clause 23: The data capture system, robotic medical system, method, non-transitory computer-readable storage medium, or computer-implemented method of any of Clauses 1-22, wherein the characteristic of the reference operator includes at least one of physician metadata.

Clause 24: The data capture system, robotic medical system, method, non-transitory computer-readable storage medium, or computer-implemented method of any of Clauses 1-23, wherein at least a part of the captured parameters is associated with case metadata.

Clause 25: The data capture system, robotic medical system, method, non-transitory computer-readable storage medium, or computer-implemented method of any of Clauses 1-24, wherein at least a portion of the captured parameters is combination of physician metadata and case metadata.

Clause 26: The data capture system, robotic medical system, method, non-transitory computer-readable storage medium, or computer-implemented method of any of Clauses 1-25, wherein recording and retrieving of data can be local or non-local to the system.

Clause 27: The data capture system, robotic medical system, method, non-transitory computer-readable storage medium, or computer-implemented method of any of Clauses 1-26, wherein the processing unit utilizes an algorithmic analysis of the inputs from one or more operators in forming the at least one profile.

Clause 28: The data capture system, robotic medical system, method, non-transitory computer-readable storage medium, or computer-implemented method of any of Clauses 1-27, wherein the processing unit is to generate a power profile associated with the at least one profile containing motion and load parameters.

Clause 29: The data capture system, robotic medical system, method, non-transitory computer-readable storage medium, or computer-implemented method of any of Clauses 1-28, wherein the processing unit calculates and determines an envelope of ranges of motion, load and power parameters.

Clause 30: The data capture system, robotic medical system, method, non-transitory computer-readable storage medium, or computer-implemented method of any of Clauses 1-29, wherein the processing unit is to generate adaptive guidance parameters for manipulation of the EMD based on motion and load parameters contained in the at least one profile.

Clause 31: The data capture system, robotic medical system, method, non-transitory computer-readable storage medium, or computer-implemented method of any of Clauses 1-30, wherein the processing unit is to generate motion and/or load profiles associated to one or more EMD.

Clause 32: The data capture system, robotic medical system, method, non-transitory computer-readable storage medium, or computer-implemented method of Clause 31, wherein the motion profile is built based on only motion parameters of the at least one profile for one EMD including concurrent rotational and linear motion of the EMD.

Clause 33: The data capture system, robotic medical system, method, non-transitory computer-readable storage medium, or computer-implemented method of Clause 31, wherein the motion profile is built based on motion parameters of the at least one profile for more than one EMD including concurrent rotational and/or linear motion of a first EMD and rotational and/or linear motion of a second EMD.

Clause 34: The data capture system, robotic medical system, method, non-transitory computer-readable storage medium, or computer-implemented method of Clause 31, wherein the motion profile is built based on load parameters of the at least one profile for more than one EMD.

Clause 35: The data capture system, robotic medical system, method, non-transitory computer-readable storage medium, or computer-implemented method of Clause 31, wherein the motion profile is built based on both motion and load parameters of the at least one profile for more than one EMD.

Clause 36: The data capture system, robotic medical system, method, non-transitory computer-readable storage medium, or computer-implemented method of any of Clauses 1-35, wherein the processing unit is to generate a master profile by combining physician metadata and case metadata.

Clause 37: The data capture system, robotic medical system, method, non-transitory computer-readable storage medium, or computer-implemented method of any of Clauses 1-36, wherein the processing unit is to combine the captured parameters from the reference operator with additional captured parameters from additional operators to generate aggregated profiles.

Clause 38: The data capture system, robotic medical system, method, non-transitory computer-readable storage medium, or computer-implemented method of any of Clauses 1-37, wherein the at least one profile generated by the processing unit is updated with further captured data from further additional operators.

Clause 39: The data capture system, robotic medical system, method, non-transitory computer-readable storage medium, or computer-implemented method of any of Clauses 1-38, wherein the processing unit updates the profile(s) as new input data are available after successive procedures on an ongoing basis.

Clause 40: The data capture system, robotic medical system, method, non-transitory computer-readable storage medium, or computer-implemented method of any of Clauses 1-39, wherein the processing unit converts the inputs from the reference operator, combined with other metadata, to operational governing equations, operational limits, and commands.

Clause 41: The data capture system, robotic medical system, method, non-transitory computer-readable storage medium, or computer-implemented method of any of Clauses 1-40, wherein the processing unit can generate, or update the at least one profile, and convert the data to operational rules either off-line or in real time.

Clause 42: The data capture system, robotic medical system, method, non-transitory computer-readable storage medium, or computer-implemented method of any of Clauses 1-41, wherein the processing unit is to provide feedback to a second operator based on the generated profiles.

Clause 43: The data capture system, robotic medical system, method, non-transitory computer-readable storage medium, or computer-implemented method of Clause 42, wherein the feedback is provided during a training simulation.

Clause 44: The data capture system, robotic medical system, method, non-transitory computer-readable storage medium, or computer-implemented method of Clause 42, wherein the feedback is provided during a live procedure performed by the second operator.

Clause 45: The data capture system, robotic medical system, method, non-transitory computer-readable storage medium, or computer-implemented method of Clause 42, wherein the second operator can selectively accept or reject the feedback.

Clause 46: The data capture system, robotic medical system, method, non-transitory computer-readable storage medium, or computer-implemented method of any of Clauses 1-45, wherein the processing unit generates adaptive guidance parameters.

Clause 47: The data capture system, robotic medical system, method, non-transitory computer-readable storage medium, or computer-implemented method of Clause 46, wherein the adaptive guidance parameters include at least one of operational governing equations or limits, procedural recommendations, motion profiles, or general rule-based motion and load, applied to the EMDs, or procedure.

We claim:

1. A system comprising:
a sensor system having sensors to capture parameters associated with inputs from a reference operator for operation of one or more elongated medical devices (EMDs); and
a processing unit to
generate at least one profile using the parameters, the at least one profile being associated with a characteristic of the reference operator, and
provide, based on the at least one profile, feedback in the form of adaptive guidance to an operator during a simulated or live procedure performed by the operator, wherein
the operator and the reference operator are different operators.

2. The system of claim 1, wherein the parameters captured by the sensors include at least one of motion or load parameters.

3. The system of claim 2, wherein the at least one of motion or load parameters include at least one of displacement, linear velocity, linear force, rotational velocity, rotational torque, acceleration, or frequency.

4. The system of claim 1, wherein the parameters captured by the sensors include at least one of (a) a combination of linear velocity and linear force, (b) a combination of rotational velocity and rotational torque, (c) a combination of at least one of displacement, velocity or acceleration and linear force, or (d) a combination of at least one of angular displacement, angular velocity or angular acceleration and torque.

5. The system of claim 1, wherein the parameters captured by the sensors include a frequency of manipulation of the EMDs.

6. The system of claim 1, wherein the parameters captured by the sensors include a combination of two or more of motion parameters, load parameters, position, displacement, frequency, linear velocity, linear force, rotational velocity or rotational torque.

7. The system of claim 1, wherein the system is stand-alone or part of a robotic medical system or a training system.

8. The system of claim 1, wherein the sensor system includes at least one of contact or noncontact sensors to detect at least one of motion or load of an EMD or stack of EMDs.

9. The system of claim 1, wherein the sensor system includes signal conditioning.

10. The system of claim 1, further comprising:
a user interface to receive the inputs from the reference operator for operation of the one or more elongated medical devices (EMDs); wherein
the user interface includes more than one EMD and the sensor system is configured to detect input parameters for concurrent operation of more than one EMD.

11. The system of claim 1, wherein the parameters are captured based on a heuristic model.

12. The system of claim 1, wherein the characteristic of the reference operator includes physician metadata, the physician metadata including a characteristic of a physician as the reference operator.

13. The system of claim 1, wherein at least a part of the parameters is associated with case metadata.

14. The system of claim 1, wherein at least a portion of the parameters is a combination of physician metadata and case metadata.

15. The system of claim 1, wherein recording and retrieving of data is local or non-local to the system.

16. The system of claim 1, wherein the processing unit is configured to utilize an algorithmic analysis of inputs from one or more reference operators in generating the at least one profile.

17. The system of claim 1, wherein the processing unit is configured to generate a power profile associated with the at least one profile containing motion and load parameters.

18. The system of claim 1, wherein the processing unit is configured to calculate and determine an envelope of ranges of motion, load and power parameters.

19. The system of claim 1, wherein the processing unit is configured to generate adaptive guidance parameters for providing the adaptive guidance based on motion and load parameters contained in the at least one profile.

20. The system of claim 1, wherein the processing unit is configured to generate at least one of a motion profile or a load profile associated with one or more EMD.

21. The system of claim 20, wherein the motion profile is built based on only motion parameters of the at least one profile for an EMD including concurrent rotational and linear motion of the EMD.

22. The system of claim 20, wherein the motion profile is built based on motion parameters of the at least one profile for more than one EMD including at least one of rotational or linear motion of a first EMD and at least one of rotational or linear motion of a second EMD.

23. The system of claim 20, wherein the motion profile is built based on load parameters of the at least one profile for more than one EMD.

24. The system of claim 20, wherein the motion profile is built based on both motion parameters and load parameters of the at least one profile for more than one EMD.

25. The system of claim 1, wherein the processing unit is configured to generate a master profile by combining physician metadata and case metadata.

26. The system of claim 1, wherein the processing unit is configured to combine the parameters with additional captured parameters from additional operators to generate aggregated profiles.

27. The system of claim 1, wherein the processing unit is configured to update the at least one profile with further captured data from further additional operators.

28. The system of claim 1, wherein the processing unit is configured to update the at least one profile as new input data are available after successive procedures on an ongoing basis.

29. The system of claim 1, wherein the processing unit is configured to convert the inputs from the reference operator, combined with other metadata, to operational governing equations, operational limits, and commands.

30. The system of claim 1, wherein the processing unit is configured to generate or update the at least one profile, and convert data of the at least one profile to operational rules either off-line or in real time.

31. The system of claim 1, wherein the operator selectively accepts or rejects the feedback.

32. The system of claim 1, wherein the processing unit is configured to generate adaptive guidance parameters for the adaptive guidance.

33. The system of claim 32, wherein the adaptive guidance parameters include at least one of operational governing equations or limits, procedural recommendations, motion profiles, or general rule-based motion and load, applied to the EMDs, or procedure.

34. A robotic medical system, comprising:
modules to actuate one or more EMDs independently and in concert;
a data capture portion to capture parameters applied to the one or more EMDs and detected by a sensor system having sensors, and which are associated with inputs from a reference operator to manipulate the one or more EMDs, the captured parameters including at least one motion or load parameter, wherein
the data capture portion is configured to associate the captured parameters with a characteristic of the reference operator; and
a processing unit to convert the captured parameters to operational governing equations for the one or more EMDs to provide adaptive guidance to an operator during a procedure using the robotic medical system; wherein
the operator and the reference operator are different operators.

35. A method comprising:
capturing input parameters from a reference operator of a robotic device, the captured input parameters including at least one motion or load parameter;
converting the input parameters to operational commands for the robotic device;
generating a profile using the input parameters, the profile being associated with a characteristic of the reference operator; and
providing, based on the profile, feedback in the form of adaptive guidance to an operator during a simulated or live procedure performed by the operator; wherein
the characteristic of the reference operator includes physician metadata, the physician metadata including a characteristic of a physician as the reference operator, and
the operator and the reference operator are different operators.

36. A non-transitory computer-readable storage medium encoded with instructions executable by a processor of a computing system, the non-transitory computer-readable storage medium comprising instructions to:

capture input parameters from a reference operator of a robotic device, the captured input parameters including at least one motion or load parameter;

convert the input parameters to operational commands for the robotic device;

generate a profile using the input parameters, the profile being associated with a characteristic of the reference operator; and provide, based on the profile, feedback in the form of adaptive guidance to an operator during a simulated or live procedure performed by the operator; wherein the characteristic of the reference operator includes physician metadata, the physician metadata including a characteristic of a physician as the reference operator, and the operator and the reference operator are different operators.

37. A computer-implemented method, comprising:

capturing input parameters from a reference operator of a robotic device, the captured input parameters including at least one motion or load parameter;

converting the input parameters to operational commands for the robotic device;

generating a profile using the input parameters, the profile being associated with a characteristic of the reference operator; and providing, based on the profile, feedback in the form of adaptive guidance to an operator during a simulated or live procedure performed by the operator; wherein the characteristic of the reference operator includes physician metadata, the physician metadata including a characteristic of a physician as the reference operator, and the operator and the reference operator are different operators.

38. A system comprising:

a user interface to receive inputs from a reference operator for operation of an elongated medical device, the user interface including sensors to detect parameters associated with the inputs from the reference operator;

a recording portion to capture the parameters detected by the sensors, the captured parameters including at least one motion or load parameter; and a processing unit to generate, based on the captured parameters, parameters for adaptive guidance in operating the elongated medical device, and provide the adaptive guidance to an operator during a simulated or live procedure performed by the operator, wherein the operator and the reference operator are different operators.

39. A robotic medical system, comprising:

a user interface to receive inputs from a reference operator;

a sensor system having sensors to detect parameters associated with the inputs from the reference operator;

a data capture portion to capture the parameters detected by the sensors;

a processing unit to convert the inputs from the reference operator to operational adaptive guidance for elongated medical devices (EMDs) and a procedure, and provide the operational adaptive guidance to an operator during a simulated or live procedure by the operator; and at least one module to actuate one or more EMDs independently and in coordination, wherein the operator and the reference operator are different operators.

40. A method comprising:

capturing input parameters from a reference operator of an elongated medical device, the input parameters including at least one motion or load parameter;

converting the input parameters to operational commands for the elongated medical device;

generating guidance parameters for the elongated medical device based on the input parameters; and providing, based on the guidance parameters, adaptive guidance to an operator during a simulated or live procedure performed by the operator; wherein the operator and the reference operator are different operators.

41. A non-transitory computer-readable storage medium encoded with instructions executable by a processor of a computing system, the non-transitory computer-readable storage medium comprising instructions to:

capture input parameters from a reference operator of a robotic device, the input parameters including at least one motion or load parameter;

convert the input parameters to operational commands for the robotic device;

generate guidance parameters for an elongated medical device based on the input parameters; and provide, based on the guidance parameters, adaptive guidance to an operator during a simulated or live procedure performed by the operator; wherein the operator and the reference operator are differs ent operators.

42. A computer-implemented method, comprising:

capturing input parameters from a reference operator of a robotic device, the input parameters including at least one motion or load parameter;

converting the input parameters to operational commands for the robotic device;

generating guidance parameters for an elongated medical device based on the input parameters; and providing, based on the guidance parameters, adaptive guidance to an operator during a simulated or live procedure performed by the operator; wherein the operator and the reference operator are different operators.

43. A system comprising:

a processing unit to generate at least one profile using parameters captured from a sensor system having sensors, and provide, based on the at least one profile, feedback in the form of adaptive guidance to an operator during a simulated or live procedure performed by the operator; wherein the parameters are associated with inputs from a reference operator for operation of one or more elongated medical devices (EMDs), received from a user interface, the parameters captured by the sensor system include at least one of (a) a combination of linear velocity and linear force, (b) a combination of rotational velocity and rotational torque, (c) a combination of at least one of displacement, velocity, or acceleration and linear force, or (d) a combination of at least one of angular displacement, angular velocity or angular acceleration and torque, and the operator and the reference operator are different operators.

44. A system comprising:

a user interface to receive inputs from a reference operator for operation of one or more elongated medical devices (EMDs);

a processing unit to generate at least one profile using parameters captured by a sensor system having sensors to capture parameters associated with the inputs from the reference operator, and provide, based on the at least one profile, feedback in the form of adaptive guidance to an operator during a simulated or live procedure performed by the operator; wherein the parameters captured by the sensors include a combination of two or more of motion parameters, load parameters, position, displacement, frequency, linear velocity, linear force, rotational velocity or rotational torque, and the operator and the reference operator are different operators.

* * * * *